(12) United States Patent
Tachibana et al.

(10) Patent No.: US 10,638,213 B2
(45) Date of Patent: Apr. 28, 2020

(54) CONTROL METHOD OF MOBILE TERMINAL APPARATUS

(71) Applicant: SONY MOBILE COMMUNICATIONS INC., Tokyo (JP)

(72) Inventors: Makoto Tachibana, Tokyo (JP); Takashi Shiina, Kanagawa (JP); Tetsuya Naruse, Kanagawa (JP); Yuichi Shirai, Tokyo (JP); Chikashi Yajima, Kanagawa (JP); Susumu Takatsuka, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/855,410

(22) Filed: Dec. 27, 2017

(65) Prior Publication Data

US 2018/0124496 A1    May 3, 2018

Related U.S. Application Data

(63) Continuation of application No. 15/078,701, filed on Mar. 23, 2016, now Pat. No. 9,860,625, which is a continuation of application No. 14/035,605, filed on Sep. 24, 2013, now Pat. No. 9,326,058.

(60) Provisional application No. 61/705,860, filed on Sep. 26, 2012.

(51) Int. Cl.
| *H04R 1/10* | (2006.01) |
| *H04R 29/00* | (2006.01) |
| *H04R 5/033* | (2006.01) |
| *H04S 7/00* | (2006.01) |
| *G06F 3/0346* | (2013.01) |
| *G06F 3/01* | (2006.01) |

(52) U.S. Cl.
CPC ......... *H04R 1/1041* (2013.01); *H04R 1/1091* (2013.01); *H04R 29/001* (2013.01); *G06F 3/012* (2013.01); *G06F 3/0346* (2013.01); *H04R 5/033* (2013.01); *H04R 2420/07* (2013.01); *H04S 7/304* (2013.01)

(58) Field of Classification Search
CPC .. H04R 1/1041; H04R 1/1091; H04R 29/001; H04R 5/033; H04R 2420/07
USPC .......... 381/74, 6, 58–59, 370–371, 376, 380
See application file for complete search history.

(56) References Cited

U.S. PATENT DOCUMENTS

| 2006/0029234 A1* | 2/2006 | Sargaison ........... H04M 1/6058 381/74 |
| 2009/0180639 A1 | 7/2009 | Dai et al. |
| 2010/0020998 A1 | 1/2010 | Brown |

(Continued)

FOREIGN PATENT DOCUMENTS

JP     2002-005675    10/2002

*Primary Examiner* — Disler Paul
(74) *Attorney, Agent, or Firm* — Xsensus LLP

(57) ABSTRACT

A mobile device system that includes left and right earphones, and a mobile device connectable to the left and right earphones. Each of the left and right earphones includes at least one of an acceleration sensor and a geomagnetic sensor. The mobile device includes a controller that monitors a wearing state of the individual left and right earphones by a user on a basis of output from the least one of the acceleration sensors and the geomagnetic sensors, and controls a behavior of the mobile device connected to the left and right earphones according to the monitored wearing state of the left and right earphones by the user.

6 Claims, 25 Drawing Sheets

(56) References Cited

U.S. PATENT DOCUMENTS

| | | | |
|---|---|---|---|
| 2010/0202626 A1* | 8/2010 | Shiori | H04R 1/1091 |
| | | | 381/74 |
| 2010/0290636 A1* | 11/2010 | Mao | H04S 7/304 |
| | | | 381/74 |
| 2011/0038484 A1 | 2/2011 | Macours | |
| 2011/0222701 A1* | 9/2011 | Donaldson | H04R 1/1083 |
| | | | 381/74 |
| 2011/0228950 A1 | 9/2011 | Abrahamsson | |
| 2012/0002822 A1 | 1/2012 | Peissig et al. | |
| 2012/0114132 A1 | 5/2012 | Abrahamsson et al. | |
| 2012/0114154 A1* | 5/2012 | Abrahamsson | H04R 5/033 |
| | | | 381/309 |
| 2013/0259244 A1* | 10/2013 | Christensen | H04S 7/304 |
| | | | 381/58 |
| 2013/0279724 A1* | 10/2013 | Stafford | H04R 1/1041 |
| | | | 381/309 |

\* cited by examiner

FIG. 22
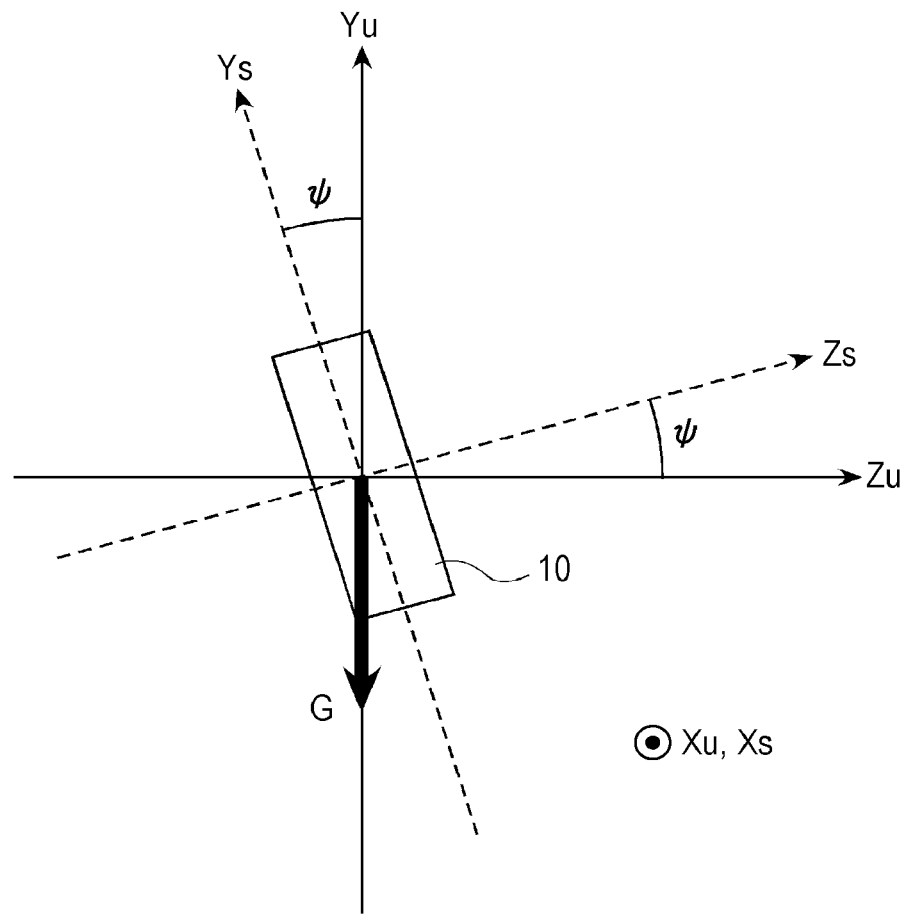
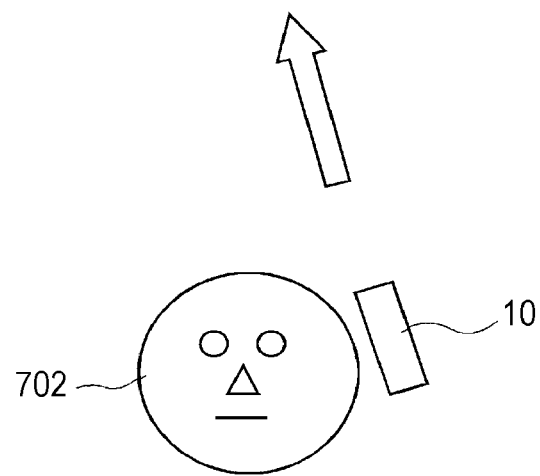

CONTROL METHOD OF MOBILE TERMINAL APPARATUS

CROSS REFERENCE TO RELATED APPLICATIONS

This application is a continuation of and claims the benefit of priority under 35 U.S.C. § 120 from U.S. application Ser. No. 15/078,701, filed Mar. 23, 2016, which is a continuation of U.S. application Ser. No. 14/035,605, filed Sep. 24, 2013, now U.S. Pat. No. 9,326,058, which is related to and claims priority under 35 U.S.C. § 119(e) to Provisional Application Ser. No. 61/705,860, filed Sep. 26, 2012, the entire contents of each of which is hereby incorporated herein by reference.

BACKGROUND

1. Field

The present specification relates to monitoring the earphone wearing state of a user wearing headphones that include left and right earphones, as well as to a method of controlling a mobile device according to the wearing state.

2. Description of the Related Art

Typically, headphones are used as an apparatus for the purpose of a user converting an audio signal output from an audio playback apparatus into a sound wave (audible sound), generally to listen to music or other such audio alone. The headphones in this specification are connected to such an audio playback apparatus in a wired or wireless manner, and include stereo types provided with a pair of left and right earphones. An earphone herein refers to the component of headphones worn so as to bring a speaker close to one of the user's ears.

Hitherto, technology providing audio-based navigation to pedestrians wearing headphones has been proposed (see PTL 1). With this technology, the angle of cranial rotation with respect to the direction in which a user is traveling (the front-to-back direction of the user's body) is computed as follows. Namely, established laser range-finding methods are used to detect the shortest distance from the user's left shoulder to the left side of the headphones, and also to detect the shortest distance from the user's right shoulder to the right side of the headphones. Additionally, a sensor worn near the base of the head is used to detect the rotational direction of the head (right-handed turning or left-handed turning as viewed from above). The angle of cranial rotation with respect to the user's travel direction is computed on the basis of these two shortest distances and cranial rotation thus detected. The position of the sound source is corrected on the basis of the angle of cranial rotation.

CITATION LIST

[Patent Literature] [PTL 1] Japanese Unexamined Patent Application Publication No. 2002-5675

Meanwhile, technology for headphones including left and right earphones that checks whether or not each earphone is being worn has not existed hitherto. If a mobile device or other device with connected headphones could ascertain the wearing state of each earphone, the possibility of diversifying mobile device control could be anticipated.

Given such background, the inventor has recognized the need for a new method of controlling a mobile device related to the wearing state of left and right earphones.

BRIEF SUMMARY

According to an exemplary embodiment, there is provided a method of controlling a mobile device that includes a step of monitoring the wearing state of left and right earphones by a user, and a step of controlling the behavior of a mobile device connected to the left and right earphones according to the wearing state of the left and right earphones by the user.

The wearing states of the left and right earphones may include a first state in which both earphones are being worn, a second state in which only the left or right earphone is being worn, and a third state in which both the left and right earphones are removed, for example.

In the step of controlling the behavior of the mobile device, at least one of launching or shutting down an application, switching the operational mode in an application, and switching the display in an application may be conducted, according to a change in the wearing state of the left and right earphones.

In the step of monitoring the wearing state of the left and right earphones by the user, the wearing state of the left and right earphones may be detected on the basis of output from left and right acceleration sensors respectively provided in the left and right earphones, and/or output from left and right geomagnetic sensors respectively provided in the left and right earphones.

The method of controlling a mobile device may further include a step of causing the user to execute a nodding gesture, in which the user looks directly ahead with respect to his or her body, rotates his or her head forward from an upright state by a given angle or more, and then returns his or her head to its original upright state, and a step of checking whether each earphone is being worn, on the basis of output during the nodding gesture from left and right acceleration sensors respectively provided in the left and right earphones.

Also, a mobile device according to an exemplary embodiment includes left and right earphones, and a mobile device connectable to the left and right earphones. Each of the left and right earphones includes an acceleration sensor and/or a geomagnetic sensor. The mobile device includes a controller that detects the wearing state of the individual left and right earphones by the user on the basis of output from the acceleration sensors and/or the geomagnetic sensors, and controls the behavior of the mobile device connected to the left and right earphones according to the wearing state of the left and right earphones.

According to an exemplary embodiment, it is possible to detect the state of whether left and right earphones are being worn by the user, and control a mobile device according to the detected wearing state.

BRIEF DESCRIPTION OF THE DRAWINGS

FIG. 22 is a diagram for explaining axis transformation by rotation about the X axis of an earphone.

DETAILED DESCRIPTION

Hereinafter, an exemplary embodiment will be described in detail and with reference to the drawings.

In the exemplary embodiment, the wearing state of the left and right earphones in a set of stereo headphones is monitored, and the behavior of a mobile device connected to the left and right earphones is controlled according to the wearing state of the left and right earphones. In order to do so, the individual left and right earphones are equipped with sensors, and the wearing state of each earphone is detected on the basis of periodically detected sensor output.

Hereinafter, a configuration for realizing the exemplary embodiment will be described, and after that, its behavior will be described.

Figure 1A:
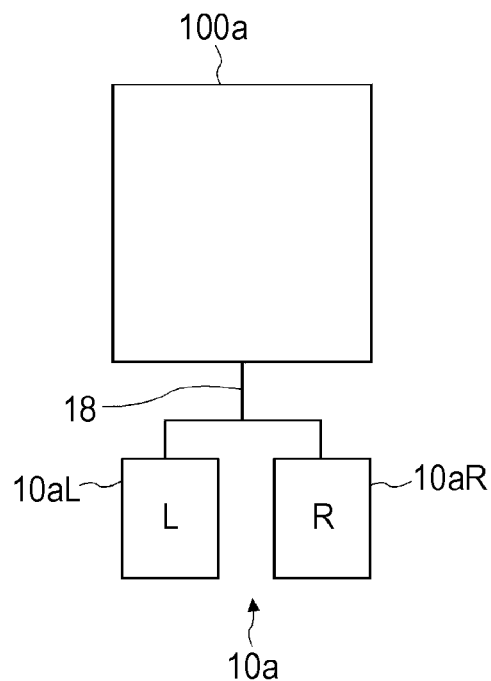
FIGS. 1A and 1B and 1C are diagrams illustrating a diagrammatic configuration of a mobile device equipped with wired and wireless stereo headphones in the exemplary embodiment, respectively.
Figure 1B:
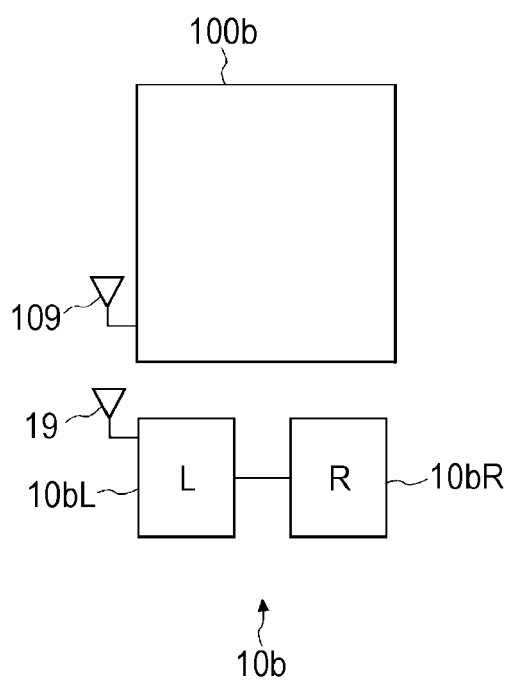
Figure 1C:
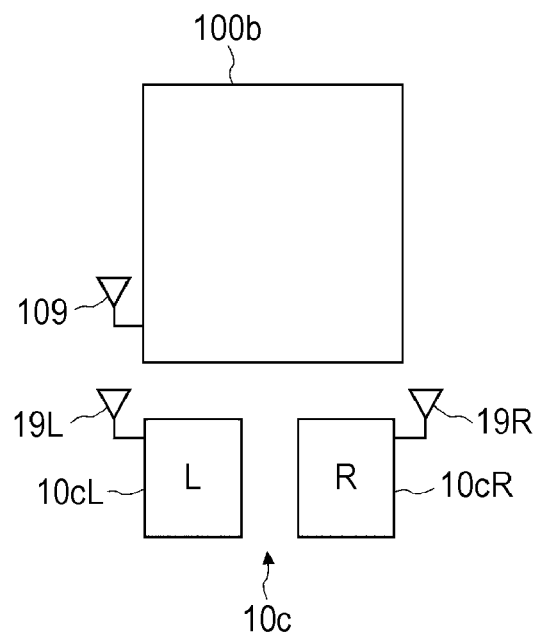

FIGS. 1(a), 1(b) and 1(c) illustrate a diagrammatic configuration of mobile devices 100a and 100b equipped with wired and wireless stereo headphones in the exemplary embodiment, respectively.

Figure 2A:
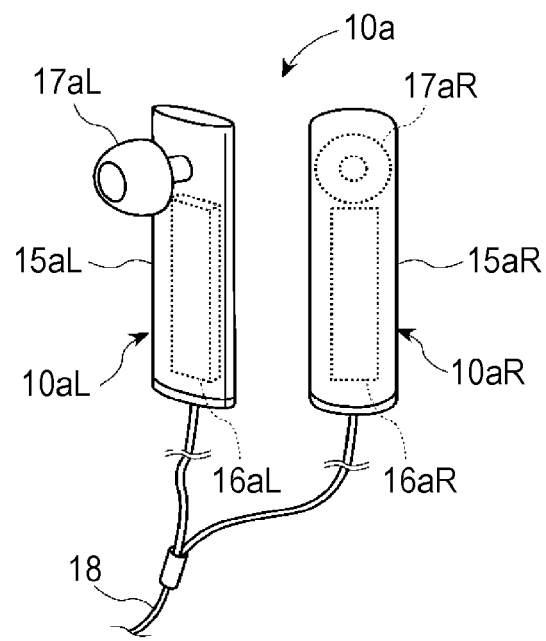
FIGS. 2A and 2B are diagrams illustrating exemplary exteriors of various types of stereo headphones.

The wired earphones 10aL and 10aR are connected to the corresponding mobile device 100a via a cable 18. The left and right earphones 10bL and 10bR are wirelessly connected to the mobile device 100b via a wireless interface using their antenna 19 and a corresponding antenna 109 in the mobile device 100b. A single antenna 19 may be shared as in FIG. 1(b) in the case where the earphones 10bL and 10bR are joined by a cable or other means as illustrated in FIGS. 2(a) (b) discussed later. In the case where the left and right earphones 10cL and 10cR are separated (independent) from each other as illustrated in FIG. 1(c), both earphones are separately equipped with antennas 19L and 19R (and communication circuits).

Figure 2B:
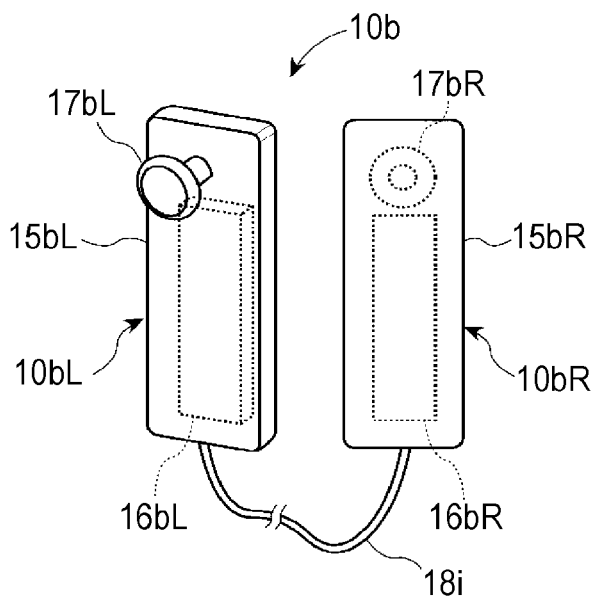

FIGS. 2(a) and 2(b) illustrate exemplary exteriors of various types of stereo headphones.

FIGS. 2(a) and 2(b) respectively illustrate headphones (ear receivers) 10a and 10b which may be referred to as inner-ear or canal headphones, and which include ear canal plugs 17aL, 17aR, 17bL, and 17bR worn inside the user's ear canal.

The wired headphones 10a illustrated in FIG. 2(a) include respective housings 15aL and 15aR, ear canal plugs 17aL and 17aR projecting from their sides, and left and right earphones 10aL and 10aR that include a cable 18 leading out from the bottom of their respective housings. Sensor devices 16aL and 16aR are housed inside the housings 15aL and 15aR of the earphones 10aL and 10aR. In the exemplary embodiment, each sensor device at least includes a geomagnetic sensor 11 and an acceleration sensor 12.

The wireless headphones 10b illustrated in FIG. 2(b) include respective housings 15bL and 15bR, ear canal plugs 17bL and 17bR projecting from their sides, and left and right earphones 10bL and 10bR that include a cable 18i connected between their respective housings 15bL and 15bR. Sensor devices 16bL and 16bR are housed inside the housings 15bL and 15bR of the earphones 10bL and 10bR. In the exemplary embodiment, each sensor device at least includes a geomagnetic sensor 11, an acceleration sensor 12, and a wireless communication unit (discussed later). The cable 18i is unnecessary in the case where both the left and right earphones 10bL and 10bR each include a wireless communication unit independently (this corresponds to FIG. 1(c)).

Hereinafter, the exemplary embodiment will be described taking headphones of the type illustrated in FIGS. 2(a) and 2(b) as an example, but the following similarly applies to other types of headphones.

Figure 3A:
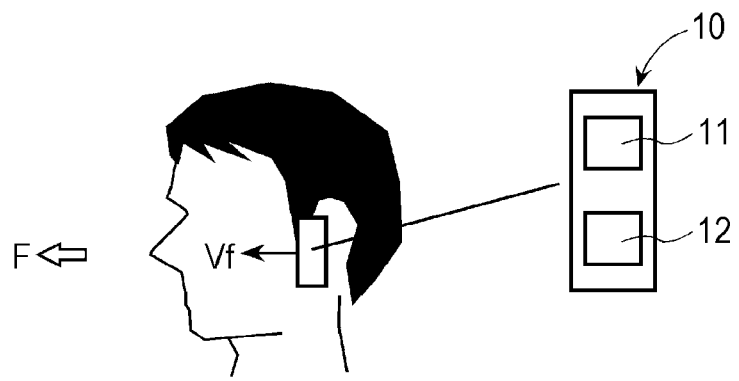
FIGS. 3A and 3B are diagrams illustrating states of a user wearing a headphone according to the exemplary embodiment.
Figure 3B:
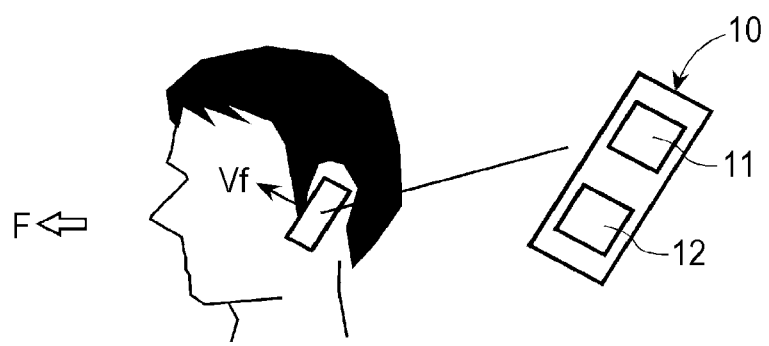

FIGS. 3(a) and 3(b) illustrate states of a user wearing headphones according to the exemplary embodiment. This example corresponds to the state of wearing a pair of earphones on the left and right ears. Hereinafter, the left and right earphones 10L and 10R will be simply designated the earphone 10 when not particularly distinguishing them.

An arbitrary application that generates sound or voice suing earphones is relevant as an example of an application applying the exemplary embodiment. Applications such as audio navigation, games, and music players are a possibility.

Potential wearing states of left and right earphones include a first state in which both earphones are being worn, a second state in which only the left or right earphone is being worn, and a third state in which both the left and right earphones are removed.

Controlling the behavior of a mobile device involves conducting at least one of launching or shutting down an application, switching the operational mode in an application, and switching the display in an application, according to a change in the wearing state of the left and right earphones.

When monitoring the wearing state of left and right earphones by the user, the wearing state of the left and right earphones is detected on the basis of output from the left and right acceleration sensors respectively on board the left and right earphones, and/or output from the left and right geomagnetic sensors respectively on board the left and right earphones.

However, depending on the application, in some cases there may be an attempt to accurately compute the direction in which the user's face is facing (the orientation F of the face) while the earphones 10 are being worn on the user's head.

Even in a state of being worn on the user's head, the earphones 10 may rotate within an angular range to some extent, mostly about an axis given by a line joining the left and right ears. FIGS. 3(a) and 3(b) illustrate states where an earphone 10 is worn on the user's head at different rotational angles. As illustrated, whereas the orientation F of the user's face and the forward direction specific to the earphone 10 (the forward vector Vf) may match in some cases, in other cases they may not match.

For an earphone 10 worn on the user's head as illustrated in FIGS. 3(a) and 3(b), the direction in which the user's face is facing (the orientation F of the face) may be determined as follows. Specifically, the forward vector Vf of the earphone 10 nearly matches the facial orientation F in the case where the user is wearing the earphone 10 such that its lengthwise direction is aligned with a direction nearly vertical from the ground (the vertical direction), as illustrated in FIG. 3(a). Meanwhile, the actual orientation F of the user's face may still be computed by correcting the forward vector Vf of the earphone on the basis of the sensor output from the acceleration sensor 12, even in the case where a tilt (wearing angle error) is produced in the earphone 10 due to how the earphone 10 is attached to the head, as illustrated in FIG. 3(b). Herein, although the rotation of the earphone about an axis given by the direction joining the user's ears is taken to be the problem, an earphone may also potentially rotate in the horizontal plane about an axis given by the vertical direction. This latter rotation in particular affects detection of the orientation of the user's face.

As discussed later, the 3-axis acceleration sensor 12 and the 3-axis geomagnetic sensor 11 on board an earphone 10 in the exemplary embodiment may also be used as an orientation detecting unit for detecting information such as the current state of the user's head, specifically the orientation F of the user's face, or in other words the direction (heading) in which the front of the head (the face) is facing.

Figure 4:
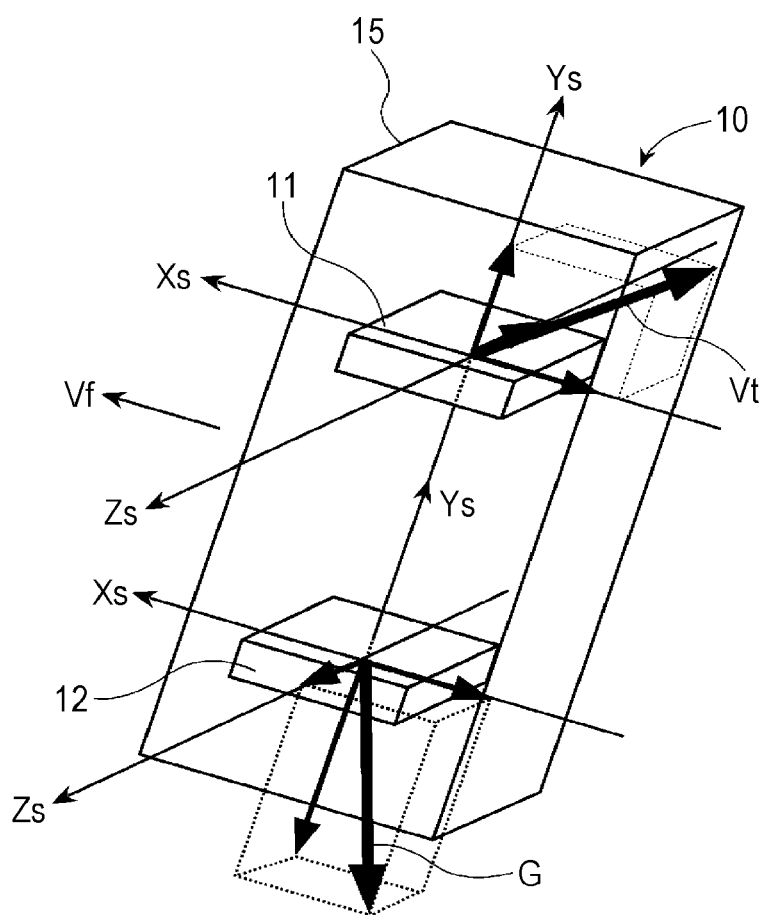
FIG. 4 is a diagram for explaining the respective action of a geomagnetic sensor and an acceleration sensor built into (the housing of) an earphone.

FIG. 4 is a diagram for explaining the respective action of the geomagnetic sensor 11 and the acceleration sensor 12 built into (the housing 15 of) an earphone 10.

The 3-axis geomagnetic sensor 11 ascertains the direction of geomagnetism, or in other words a geomagnetic vector Vt, given the current orientation of (the housing 15 of) the earphone 10 housing the 3-axis geomagnetic sensor 11.

Herein, for the sake of explanation, take an Xs axis, a Ys axis, and a Zs axis to be three mutually orthogonal axes in a local three-dimensional coordinate system specific to the earphone 10 (in other words, specific to the sensor; a sensor coordinate system). The Xs axis corresponds to the front and back direction of the earphone, while the Ys axis corresponds to the top and bottom direction of the earphone. The Zs axis is the axis orthogonal to the Xs axis and the Ys axis. The Zs axis mostly corresponds to the direction along the line joining the user's ears when the user wears the earphone 10. In the case where the earphone 10 is an earphone 10L worn on the user's left ear, an ear-contacting portion (ear canal plug) is disposed on the side of the housing 15 in the negative direction of the Zs axis. Conversely, in the case of an earphone 10R worn on the user's right ear, an ear-contacting portion is disposed on the side of the housing 15 in the positive direction of the Zs axis. The Xs axis is orthogonal to both the Ys axis and the Zs axis. In this example, the positive direction of the Xs axis is taken to match the forward vector Vf of the earphone 10. A geomagnetic vector Vt typically may be decomposed into Xs, Ys, and Zs axis components as illustrated.

The 3-axis acceleration sensor 12 ascertains the direction of gravity, or in other words a gravity vector G, given the current orientation of (the housing 15 of) the earphone 10 housing the 3-axis acceleration sensor 12 in a still state. The gravity vector G matches the downward vertical direction. The gravity vector G likewise may be decomposed into Xs, Ys, and Zs axis components as illustrated.

By using the 3-axis acceleration sensor 12 in this way, it is possible to detect the orientation of the earphone 10 in the three-dimensional space in which (the housing 15 of) the earphone 10 is disposed. By comparing the sensor output and its variation according to the orientations of the left and right earphones, it is possible to detect the wearing state of left and right earphones 10. In addition, it is possible to detect the wearing state of left and right earphones 10 by also using left and right 3-axis geomagnetic sensors 11.

First, in the state in which the left and right earphones are both being worn (the first state), it is conceivable that the output from the acceleration sensors 12 (or the absolute values thereof) will mostly match, and their variation will also indicate common tendencies. Likewise for the left and right geomagnetic sensors 11, it is conceivable that the detected geomagnetic directions will mostly match, and their variation will also indicate common tendencies. Consequently, it may be determined that both earphones are in a worn state in the case where, after both earphones are worn initially, variation in the output from the acceleration sensors 12 and/or the geomagnetic sensors 11 are similar for left and right.

Next, in the case where either the left or right earphone is removed starting from the above state, it is conceivable that variation in the acceleration sensor 12 and the geomagnetic sensor 11 will be small for the earphone that was not removed, whereas variation in the acceleration sensor 12 and the geomagnetic sensor 11 will be extremely large by comparison for the earphone that was removed. Consequently, when such a relationship is detected between the left and right output from the acceleration sensors 12 and the geomagnetic sensors 11, it may be determined that the headphones have transitioned from the first state to the second state, in which only either the left or right earphone is being worn.

In the case where only the output from the acceleration sensor 12 and the geomagnetic sensor 11 of the earphone being worn changes greatly starting from such a second state, it may be determined that the headphones have transitioned to the third state, in which both the left and right earphones have been removed.

Furthermore, according to an orientation detecting unit of the exemplary embodiment, it is possible to detect the heading (such as north, south, east, or west) in which the front of (the housing 15 of) an earphone 10 is facing. It is possible to detect the wearing state of the left and right earphones by also detecting the heading in which the fronts of the left and right earphones are facing and its variation. However, in the exemplary embodiment, it is not strictly necessary to actually compute the heading.

Note that the user may also be made to perform a nodding gesture as discussed later, in order to initially check the state in which the user is wearing the headphones. In this specification, a nodding gesture refers to a gesture in which the user looks directly ahead with respect to his or her body, rotates his or her head forward from an upright state by a given angle or more, and then returns his or her head to its original upright state. With such a gesture, it is possible to check, on the basis of the sensor output during the nodding gesture, whether or not the user is wearing each earphone, and also whether the earphones are being correctly worn on the left and right.

Figure 5A:
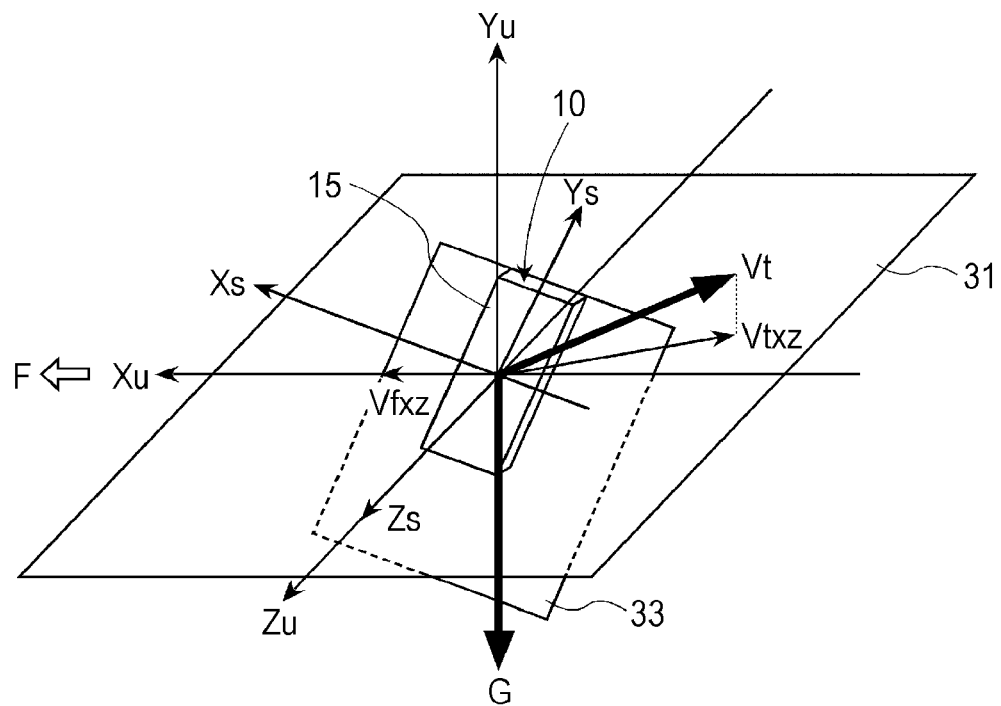
FIGS. 5A and 5B are diagrams for explaining relationships of various vectors and various angles in a three-dimensional coordinate system in which an earphone is disposed.
Figure 5B:
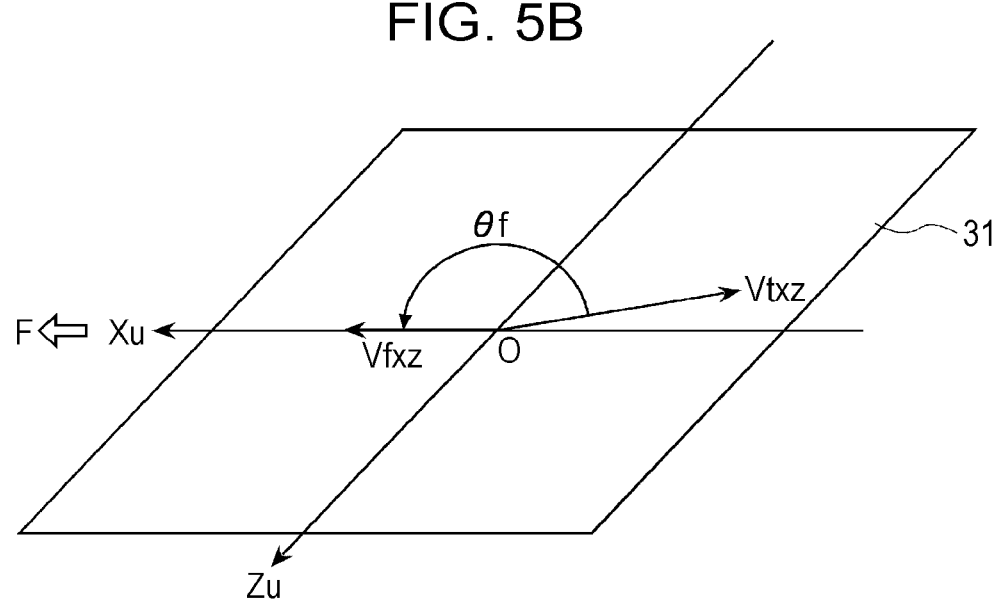

FIGS. 5(a) and 5(b) are diagrams for explaining relationships of various vectors and various angles in a three-dimensional coordinate system in which an earphone is disposed.

As illustrated in FIG. 5(a), take an Xu axis, a Yu axis, and a Zu axis to be the mutually orthogonal axes of a coordinate system for a three-dimensional space in which an earphone 10 is disposed, or in other words, the three-dimensional space in which the user is positioned. This coordinate system is called the user coordinate system (Xu, Yu, Zu) to distinguish it from the sensor coordinate system (Xs, Ys, Zs) as above. The variables used in both these coordinate systems will be distinguished with the subscripts s (sensor) and u (user). The Xu axis corresponds to the front and back direction of the user, while the Yu axis corresponds to the top and bottom direction of the user. The Zu axis is the axis orthogonal to the Xu axis and the Yu axis. The negative direction of the Yu axis lies along the gravity vector G. The plane orthogonal to the gravity vector G is the XuZu plane, and corresponds to a horizontal plane 31 in the space where the user is positioned. For the sake of convenience, the Zu axis is taken to match the Zs axis.

As discussed earlier, when the user wears the earphone 10, the top and bottom direction (lengthwise direction) of the earphone 10 does not necessarily match the vertical direction. Likewise, the example in FIG. 5(a) illustrates an example where the vertical direction (the direction along the Yu axis) and the Ys axis direction of the sensor coordinate system do not match.

For the sake of convenience, imagine a plane 33 containing a face of the housing 15 of an earphone 10 (the face that comes into contact with the user's ear), as illustrated in FIG. 5(a). The direction of the line where the plane 33 and the horizontal plane 31 intersect (the vector Vfxz) may be determined to be the orientation F of the user's face. The orientation F of the face computed in this way may include some degree of error with respect to the exact orientation of the face, due to how the earphone is worn. However, this error is considered to be within an acceptable range for many applications.

The user's nodding gesture discussed above may be used as a method of more accurately computing the orientation F of the face. In other words, it may be configured such that when the user wears headphones, the user is requested to perform a nodding gesture with his or her head in the forward direction, and the error between the forward direction of the headphones and the orientation of the user's face is computed on the basis of output from the acceleration sensor in a state before the nodding and a state at the maximum nodding angle. In this case, it is possible to accurately detect the current orientation of the face of a user wearing an earphone, and use this orientation for various controls in relevant applications. Accurately detecting the orientation of a user's face may be conducted by detecting the wearing state and wearing angle of the earphone. Particularly, by detecting the offset angle between the orientation of the user's face on a horizontal plane (the forward direction) and the forward direction of the sensor mounted on board the earphone (a specific axis), it is possible to correct the forward direction determined by the sensor. With such a method, it is possible to detect the orientation of the user's face may be detected with higher precision. This specific method will be later discussed in detail.

A reference azimuth vector Vtxz is obtained from the geomagnetic vector Vt by projecting this vector onto the horizontal plane 31. The vector Vfxz on the horizontal plane 31 is specified as the vector in the direction of an angle θf based on the reference azimuth vector Vtxz.

By using the geomagnetic sensor 11 and the acceleration sensor 12 in combination, it is possible to obtain information on the direction (heading) in which the user (the user's face) is facing which is required for navigation or other applications, even when the user is in a stationary state, or in other words even if the user is not moving. Also, sensors of comparatively small size may be used for these sensors with current device technology, and thus it is possible to install such sensors on board an earphone without difficulty.

Figure 6A:
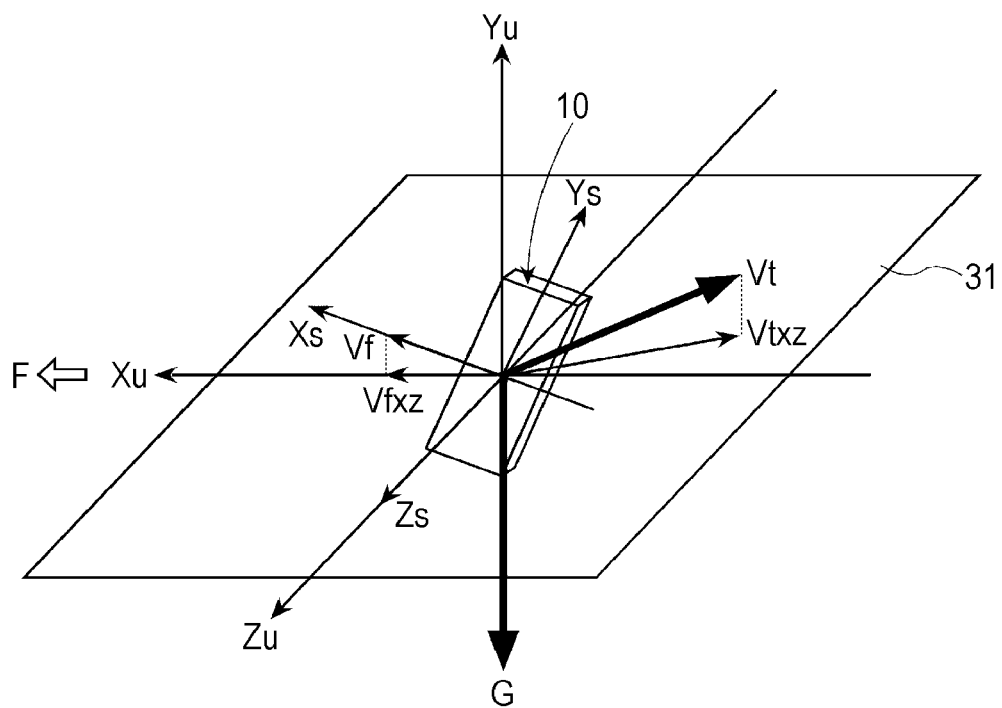
FIGS. 6A and 6B are another set of diagrams for explaining relationships of various vectors and various angles in a three-dimensional coordinate system in which an earphone is disposed.
Figure 6B:
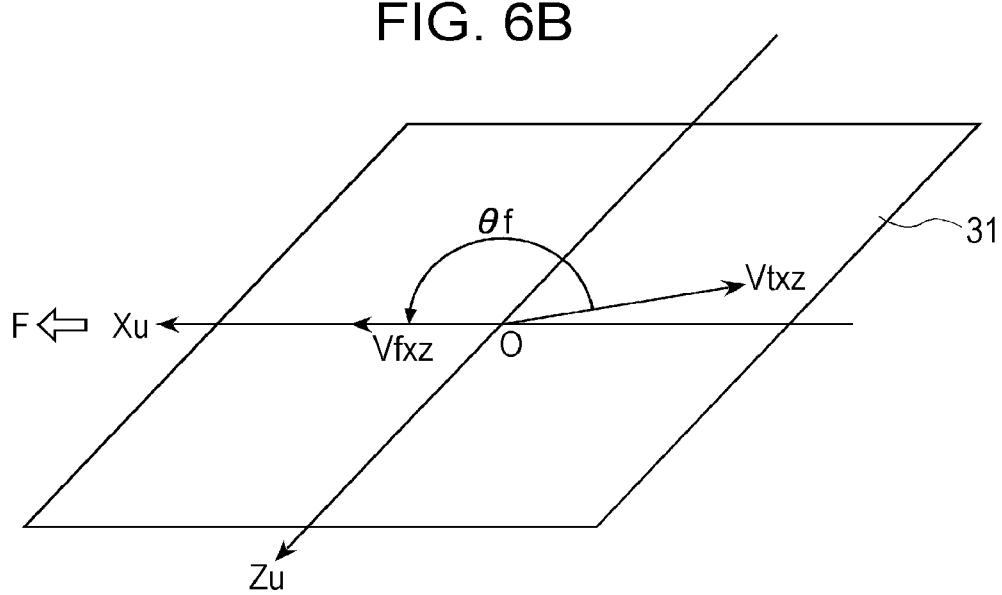

FIGS. 6(a) and 6(b) are another set of diagrams for explaining relationships of various vectors and various angles in a three-dimensional coordinate system in which an earphone is disposed.

Instead of computing the orientation F of the face as described with FIG. 5(a), the forward vector Vf along the X axis direction may also be approximately set, as illustrated in FIG. 6(a). In this example, the forward vector Vf matches the positive direction of the Xs axis. The magnitude of the forward vector Vf is arbitrary (or a unit vector). The direction indicated by a vector Vfxz obtained by projecting the forward vector Vf onto the horizontal plane, or in other words the XuZu plane 31, may be determined to be the orientation F of the user's face. The orientation F of the face computed according to the forward vector Vf does not necessarily match the orientation F of the face described with FIG. 5(a), and likewise may include error with respect to the exact orientation of the face. However, the orientation F of the face may be computed quickly and easily.

In either case, if the user moves his or her head, an earphone 10 being worn on the head moves together with it. In response to such movement of the head, the current vertical direction with respect to the earphone 10 (the gravity vector G) is detected at individual points in time. Also, as the head moves, the plane 33 (or the forward vector Vf) in the user coordinate system changes, and a new corresponding vector Vfxz (or orientation F of the face) is determined.

Figure 7A:
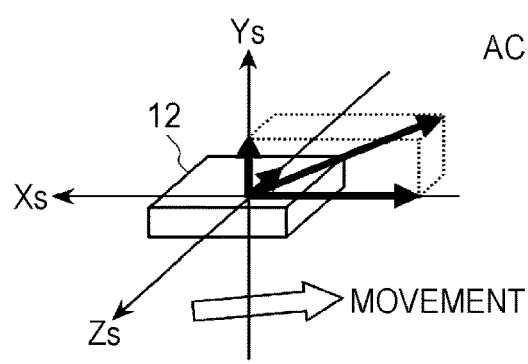
FIGS. 7A and 7B are diagrams for explaining acceleration sensor action other than detecting a gravity vector.
Figure 7B:
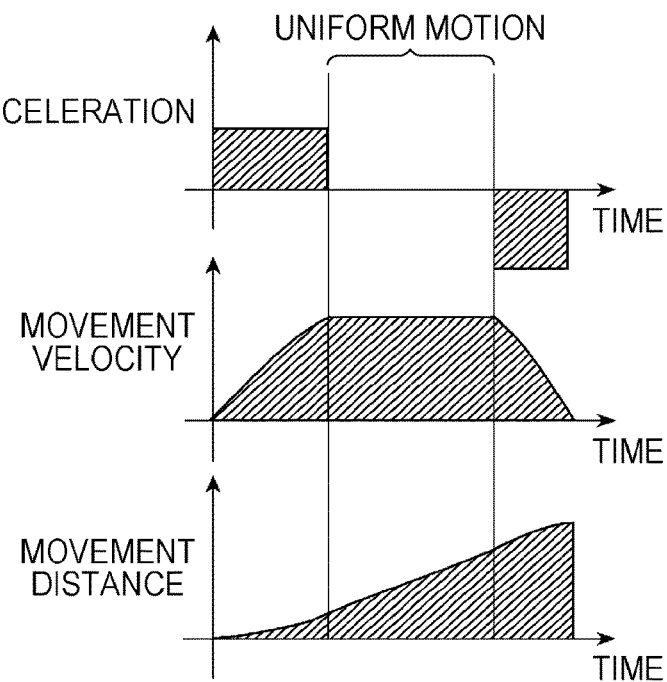

FIGS. 7(a) and 7(b) are diagrams for explaining action of the acceleration sensor 12 besides detecting a gravity vector.

As illustrated in FIG. 7(a), besides detecting constant accelerations such as gravity, the acceleration sensor 12 is also able to detect dynamic accelerations that accompany movement. For example, in the case where an object moves, positive acceleration is imparted to that object from a stationary state, and negative acceleration is imparted when the object stops. For this reason, the acceleration of an object is detected, and from the integral thereof it is possible to compute the movement velocity and the movement distance, as illustrated in FIG. 7(b). However, since the acceleration does not change in the case of uniform motion, the movement state cannot be detected unless an acceleration from a stationary state is detected. Also, due to the configuration of the acceleration sensor 12, rotations cannot be detected in the case of rotation about the gravity vector as axis.

Figure 8A:
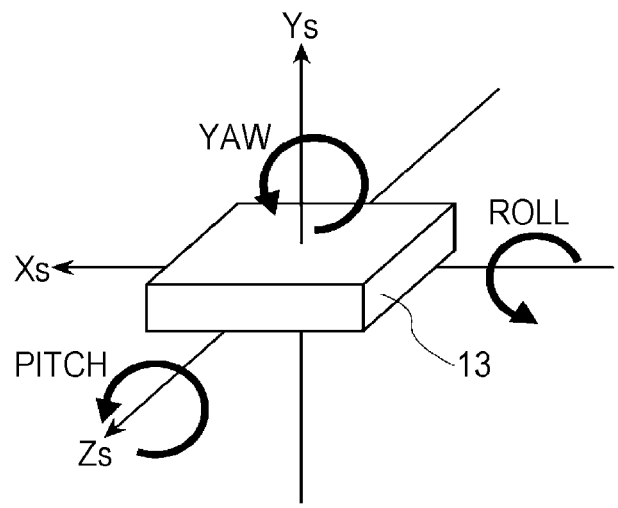
FIGS. 8A, 8B, and 8C are diagrams for explaining an example of jointly using a gyroscope as a sensor.
Figure 8B:
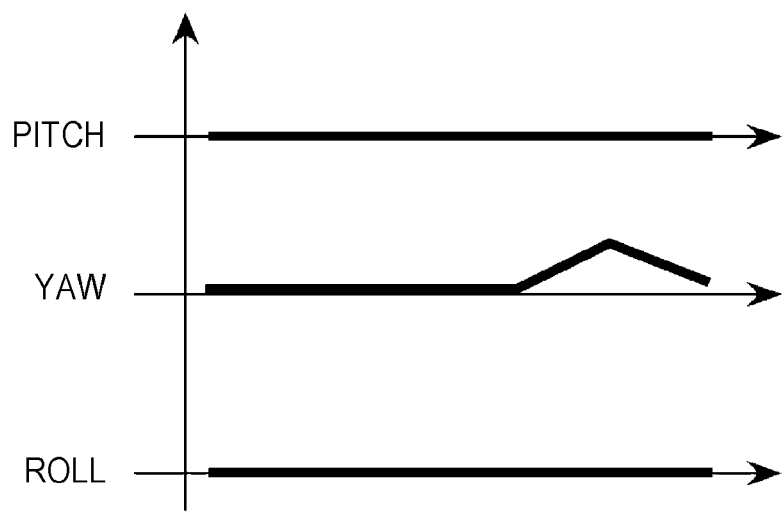
Figure 8C:
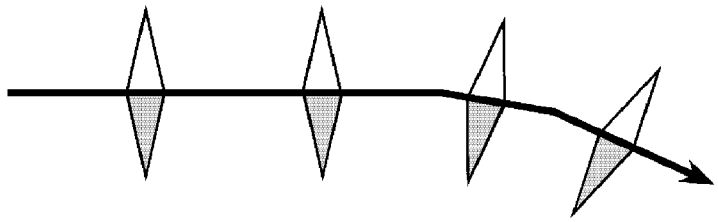

In contrast, FIGS. 8(a), 8(b), and 8(c) will be used to explain an example of jointly using a gyroscope as a sensor.

As illustrated in FIG. 8(a), the gyroscope 13 is a sensor that detects angular velocity about the three axes Xs, Zs, and Ys (roll, pitch, and yaw), and is able to detect the rotation of an object. In addition, the geomagnetic sensor 11 is able to ascertain the heading in which the object faces, on the basis of a geomagnetic vector as discussed earlier. However, in cases where the magnetic field lines are not in a constant direction, such as when near a magnetized steel frame, it may become impossible to recognize the correct heading in some cases when the object rotates while moving. For this reason, the rotational state may be detected with the gyroscope only in cases of movement like that illustrated in FIG. 8(c). Herein, the object is represented by a compass needle for the sake of convenience.

Consequently, by jointly using a gyroscope 13 together with the above acceleration sensor 12 and geomagnetic sensor 12 as sensors installed on board an earphone 10, it may be configured to supplement the output from both sensors.

In this way, although it is possible to detect the orientation F of the user's face in real-time and with some degree of precision using only a geomagnetic sensor and an acceleration sensor 12, by jointly using a gyroscope (gyro sensor) it becomes easy to track even comparatively fast changes in direction by the user.

Hereinafter, a configuration of a mobile device and headphones (earphones) shared by both of the exemplary embodiments will be described. A variety of apparatus are known as mobile devices, such as mobile phone handsets, audio players, video players, television sets, radio receivers, electronic dictionaries, and game consoles.

Figure 9:
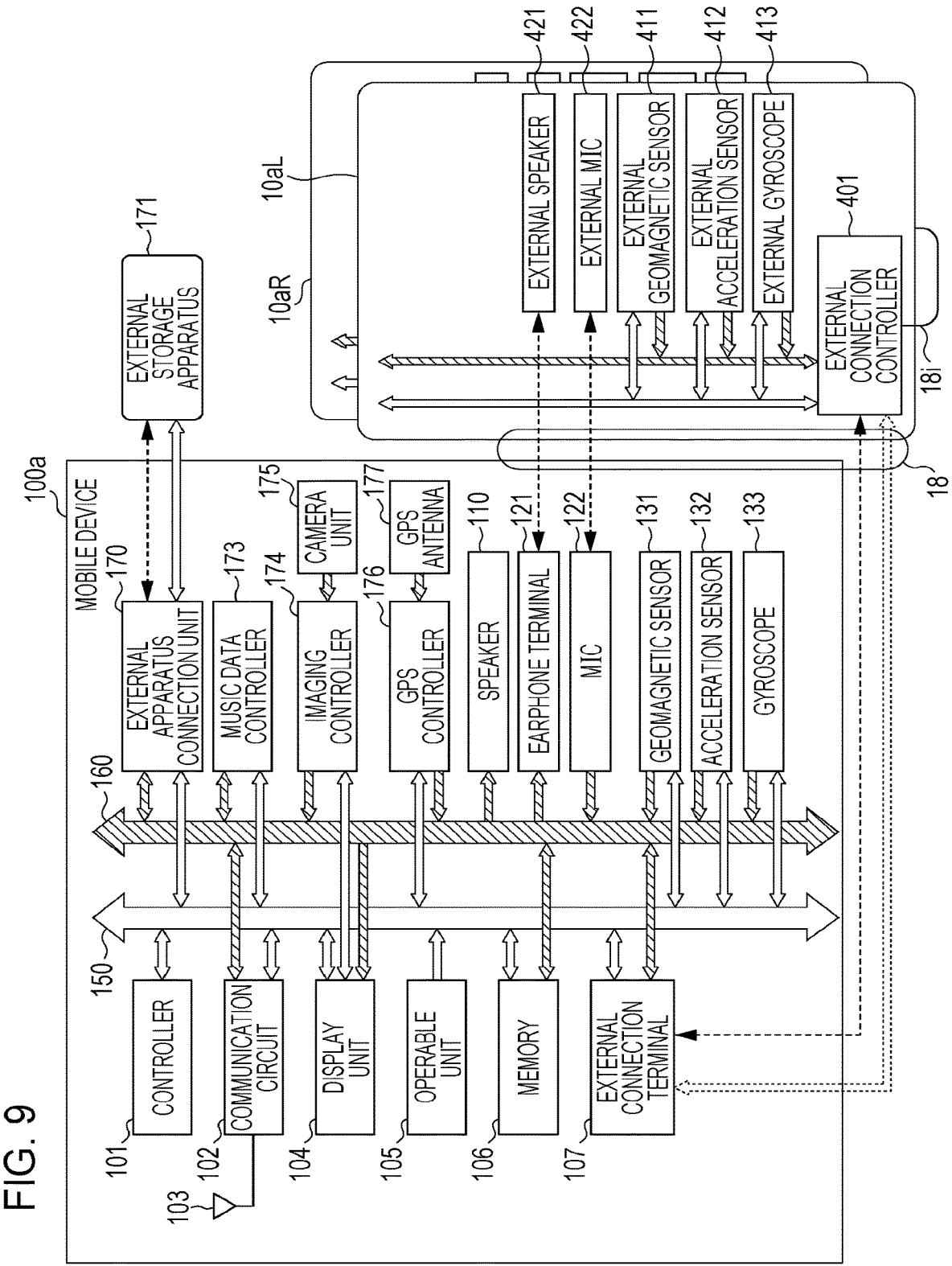
FIG. 9 is a block diagram illustrating an exemplary configuration of a mobile device in an exemplary embodiment.

FIG. 9 is a block diagram illustrating an exemplary configuration of a mobile device 100a in the exemplary embodiment. The mobile device 100a is equipped with wired stereo earphones 10aL and 10aR. Headphones provided with earphones with an attached microphone is typically called a headset. Although a microphone was not particularly illustrated in the block diagrams or exterior views of the various earphones discussed earlier, a microphone may be built in. Although a microphone may be housed inside the housing 15, it is also possible to dispose a microphone projecting outward therefrom or partway along the cable 18.

The mobile device 100a includes a control line 150 and a data line 160, and is configured by various functional units like the following, which are connected to these lines.

The controller 101 is composed of a processor made up of a central processing unit (CPU) or the like. The controller 101 executes various control programs and application programs, and also conducts various data processing associated therewith. In the data processing, the controller 101 exerts communication control, audio processing control, image processing control, various other types of signal processing, and control over respective units, for example.

The communication circuit 102 is a circuit for wireless communication used when the mobile device 100 communicates with a wireless base station on a mobile phone network, for example. The antenna 103 is a wireless communication antenna used when the mobile device 100a wirelessly communicates with a wireless base station.

The display unit 104 is a component that administers a display interface for the mobile device, and is composed of a display device such as a liquid crystal display (LCD) or an organic electroluminescent (OEL) display. The display unit 104 may be additionally equipped with a light emitter such as a light-emitting diode (LED).

The operable unit 105 is a component that administers an input interface to the user, and includes multiple operable keys and/or a touch panel.

The memory 106 is an internal storage apparatus composed of RAM and flash memory, for example. The flash memory is non-volatile memory, and is used in order to store information such as operating system (OS) programs and control programs by which the controller 101 controls respective units, various application programs, and compressed music/motion image/still image data content, as well as various settings, font data, dictionary data, model name information, and device identification information, for example. In addition, other information may be stored, such as an address book registering the phone numbers, email addresses, home addresses, names, and facial photos of users, sent and received emails, and a scheduler registering a schedule for the user of the mobile device. The RAM stores temporary data as a work area when the controller 101 conducts various data processing and computations.

The external connection terminal 107 is a connector that connects to the cable 18 leading to the earphone 10a.

The external apparatus connection unit 170 is a component that controls the reading and writing of a removable external storage apparatus 171 with respect to the mobile device 100a. The external storage apparatus 171 is an external memory card such as what is called a Secure Digital (SD) card, for example. In this case, the external apparatus connection unit 170 includes a slot into which an external memory card may be inserted or removed, and conducts reading/writing control of data with respect to the external memory card, as well as signal processing.

The music data controller 173 is a component that reads and plays back music data stored in the external storage apparatus 171 or the memory 106. The music data controller 173 may also be configured to be able to write music data. Played-back music data may be converted into sound at the earphones 10a (10aL and 10aR) to enable listening.

The imaging controller 174 controls imaging by a built-in camera unit 175.

The GPS controller 176 functions as a position detector for receiving signals from given satellites with a GPS antenna 177 and obtaining position information (at least latitude and longitude information) for the current location.

The speaker 110 is an electroacoustic transducer for outputting received telephony audio that converts an electrical signal into sound. The microphone unit (mic) 122 is a device for outputting telephony transmitter audio, and converts sound into an electrical signal.

In the case where the earphones 10a are connected to the mobile device 100a, an external speaker 421 and an external mic 422 inside the earphones 10a are used instead of the speaker 110 and the mic 122 built into the device. The external speaker 421 of the earphones 10a is connected to an earphone terminal 121 via the cable 18.

A geomagnetic sensor 131, an acceleration sensor 132, and a gyroscope 133 are also built into the mobile device 100a. These sensors are for detecting information such as the orientation and movement velocity of the mobile device 100, and are not directly used in the exemplary embodiments.

The earphones 10aL and 10aR each include the external speaker 421, the external mic 422, an external geomagnetic sensor 411, an external acceleration sensor 412, an external gyroscope 413, and an external connection controller 401. However, the external mic 422 and the external gyroscope 413 are not required elements in the exemplary embodiments.

The external connection controller 401 is connected to the respective sensors by a control line and a data line, while also being connected to the external connection terminal 107 of the mobile device 100 via the cable 18. Preferably, output from each sensor is acquired periodically or as necessary in response to a request from the mobile device 100, and transmitted to the mobile device 100 as sensor detection signals. More specifically, the external connection controller 401 includes various external connectors such as a connector according to the standard known as USB 2.0 (Universal Serial Bus 2.0), for example. For this reason, the mobile device is also equipped with a USB 2.0 controller.

Note that the mobile device 100a may also include various components which are not illustrated in FIG. 9, but which are provided in existing mobile devices.

Regarding duplicate sensors on board the left and right earphones, the question of whether to use the same sensors in both the left and right earphones or only those on one side may differ by application. For example, both the left and right sensors are used in order to check the wearing state of the left and right earphones in the exemplary embodiments. It is sufficient to use only the sensors on one side in a worn state in order to detect the correct orientation of the user's face.

Figure 10:
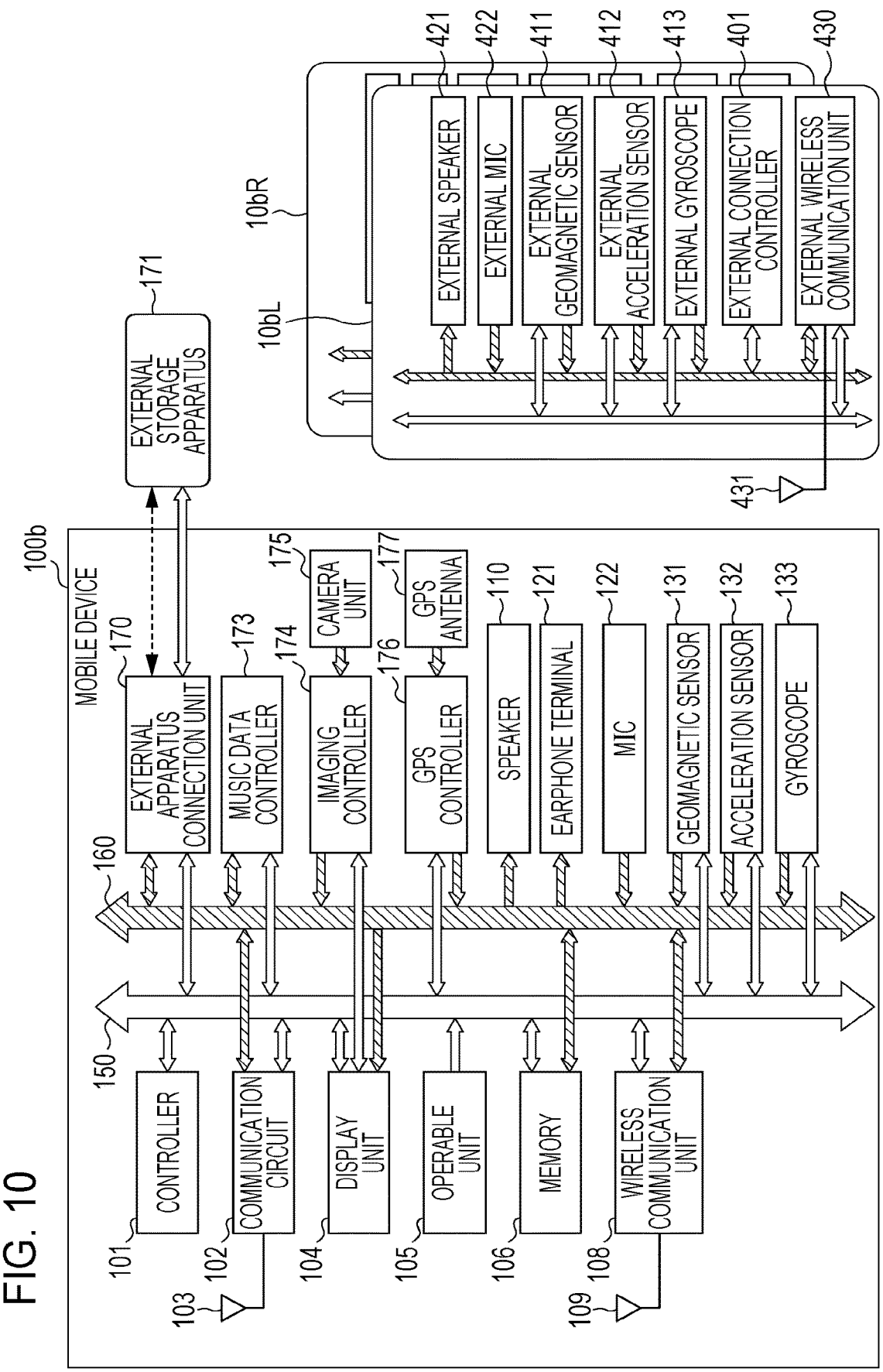
FIG. 10 is a diagram illustrating an exemplary configuration of a mobile device that uses wireless left and right earphones.

FIG. 10 illustrates an exemplary configuration of a mobile device 100b that uses wireless left and right earphones 10bL and 10bR. Since the configuration is generally the same as that of the mobile device 100a illustrated in FIG. 9, similar elements are denoted with the same reference signs, and duplicate description thereof will be reduced or omitted. The earphone 10bL is equipped with an external wireless communication unit 430 and an external communication antenna 431, and wirelessly communicates with the antenna 109 of a wireless communication unit 108 in the mobile device 100b. The wireless communication is short-range wireless communication, and wireless communication is conducted over a comparatively short range according to a short-range wireless communication format such as Bluetooth®, for example. Similarly to the earphone 10bL, the other earphone 10bR is equipped with an external wireless communication unit 430 and an external communication antenna 431, and wirelessly communicates with the antenna 109 of the wireless communication unit 108 in the mobile device 100b. In the case where the earphone 10bR and the earphone 10bL are connected by a cable (18i), it is sufficient to provide the external wireless communication unit 430 and the external communication antenna 431 in only one of the earphones.

Next, the nodding gesture that the user is made to execute in the exemplary embodiment will be described. Although the nodding gesture is not strictly required in the exemplary embodiment, causing the user to perform a nodding gesture makes it possible for the controller 101 of the mobile device to check, on the basis of the sensor output during the nodding gesture, whether or not the user is wearing each earphone, and also whether the earphones are being correctly worn on the left and right.

The user is made to execute the nodding gesture as an initial gesture when the user puts on the earphones (headphones) and starts execution of the application to be used, or at a given time, such as when connecting earphones to a mobile device. For this reason, it may be configured such that explicit instructions for performing the nodding gesture are indicated by the user interface with a display or sound (or voice) at every instance of such a given time. Alternatively, the user may be informed of the necessity of a nodding gesture manually or otherwise as determined by the application.

Figure 11:
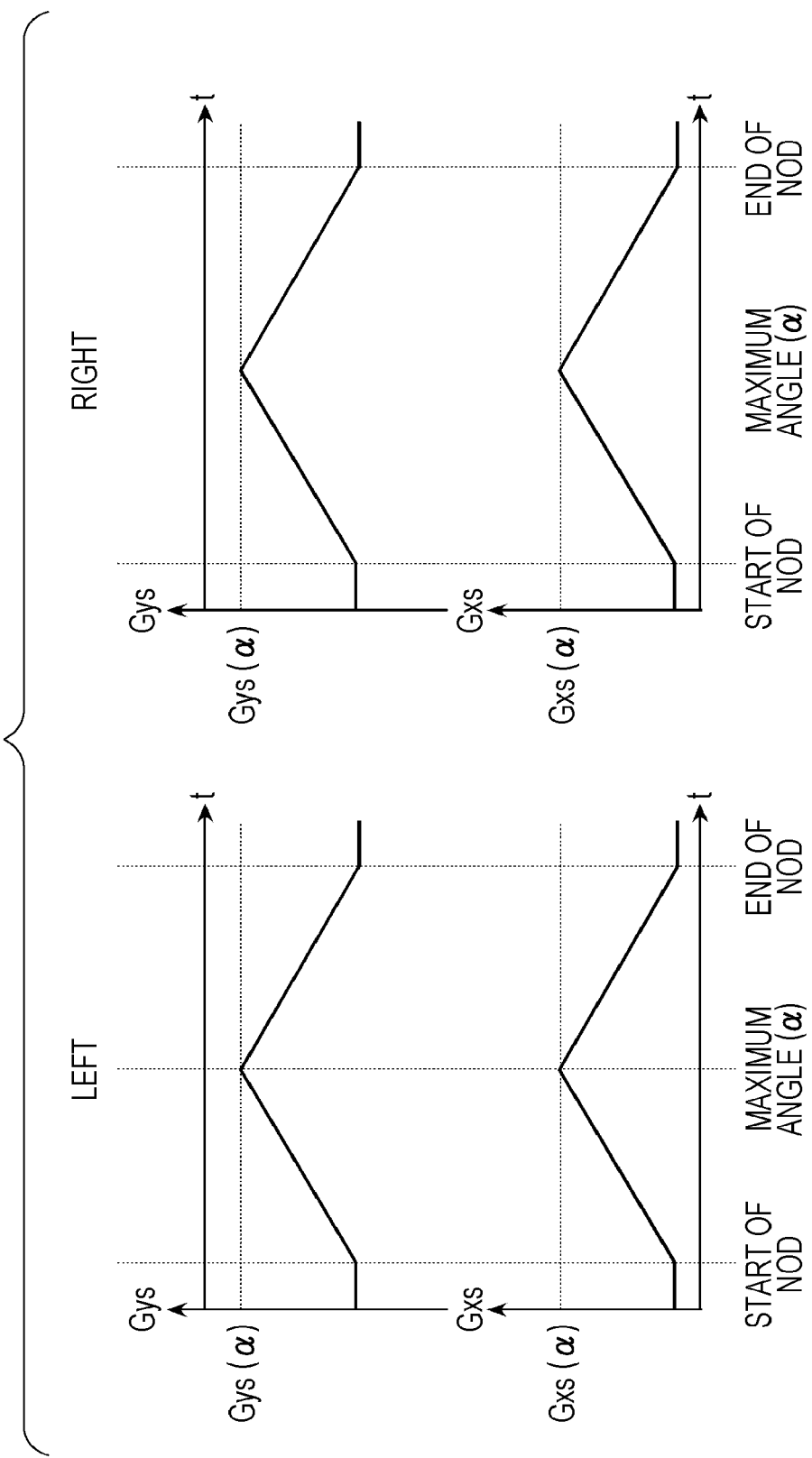
FIG. 11 is a graph illustrating change in the gravity-induced acceleration components Gys and Gxs for left and right acceleration sensors during a nodding gesture in which a user is correctly wearing left and right earphones.

FIG. 11 illustrates variation in the gravity-induced acceleration components Gys and Gxs for left and right acceleration sensors during a nodding gesture in which a user is correctly wearing left and right earphones. Both graphs are obtained by monitoring the X axis and Y axis sensor output from the acceleration sensors over a given interval at a given sampling period. As the drawing demonstrates, the left and right sensor output Gys and Gxs have waveforms of nearly the same shape. In other words, on both the left and the right, the X axis output and the Y axis output from the 3-axis acceleration sensor exhibits convex change as they vary from the start time to the end time of a nodding gesture, increasing at first but then decreasing after reaching maximum values Gys($\alpha$) and Gxs($\alpha$), and returning to their initial values. Note that although the acceleration sensor output is designed to exhibit convex variation during a nodding gesture in which the user is correctly wearing left and right earphones, the acceleration sensor output may also be designed to conversely exhibit concave variation in such cases. The important point is that since the output from the left and right acceleration sensors vary similarly (symmetrically), it may be determined that the left and right earphones are both being worn.

Assuming that the user is stationary during the nodding gesture, it is anticipated that there will be little variation in the output from the acceleration sensor in an earphone that is not being worn. Moreover, even if the user does move, it is conceivable that the output from the acceleration sensor in an earphone being worn will differ greatly (be asymmetric to) the output from the acceleration sensor in an earphone not being worn.

Figure 12:
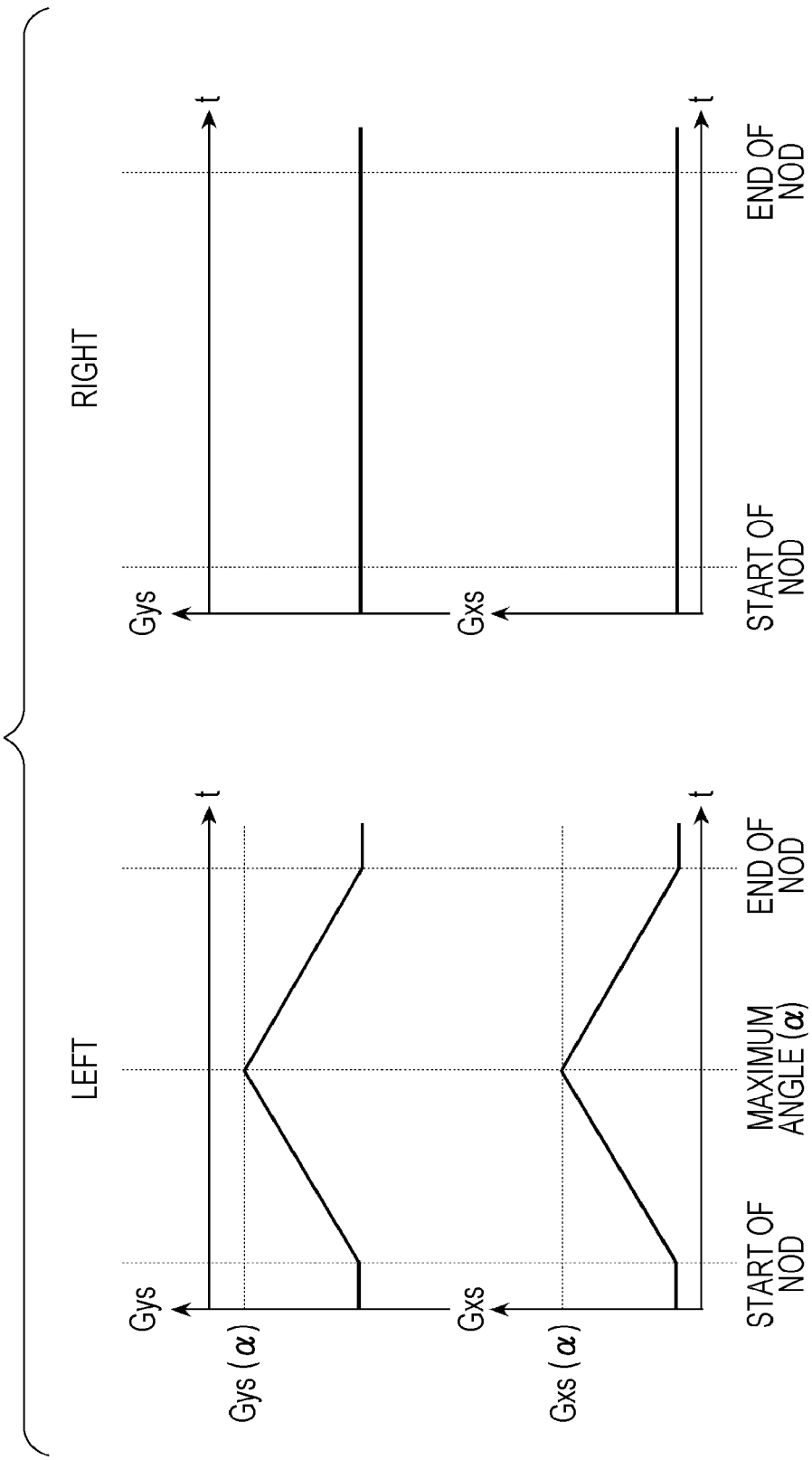
FIG. 12 is a graph illustrating asymmetry in the output from left and right acceleration sensors.

For example, in the case where only the left earphone is being worn and the right earphone is not being worn, the output from the left and right acceleration sensors becomes asymmetric, as illustrated in FIG. 12. In this example, only the output from the left acceleration sensor exhibits convex variation, while the output from the right acceleration sensor stays flat. Although not illustrated, in the case where only the right earphone is being worn and the left earphone is not being worn, the graphs in FIG. 12 are swapped left and right. Also, although the output from the left and right acceleration sensors is symmetric in the case where a nodding gesture is performed in a state where neither of the left and right earphones are being worn, their variation does not exhibit convex variation.

Note that ordinarily, the two earphones in a set of stereo headphones are statically determined in advance to be a left earphone and a right earphone, respectively. For this reason, when using the headphones, the user puts on the headphones by visually checking the left and right earphones. If the user mistakenly wears the headphones backwards, not only will the left and right stereo audio be reversed, but the detection results based on sensor output will be off by approximately 180°, and there is a risk of no longer being able to expect correct operation.

Figure 13:
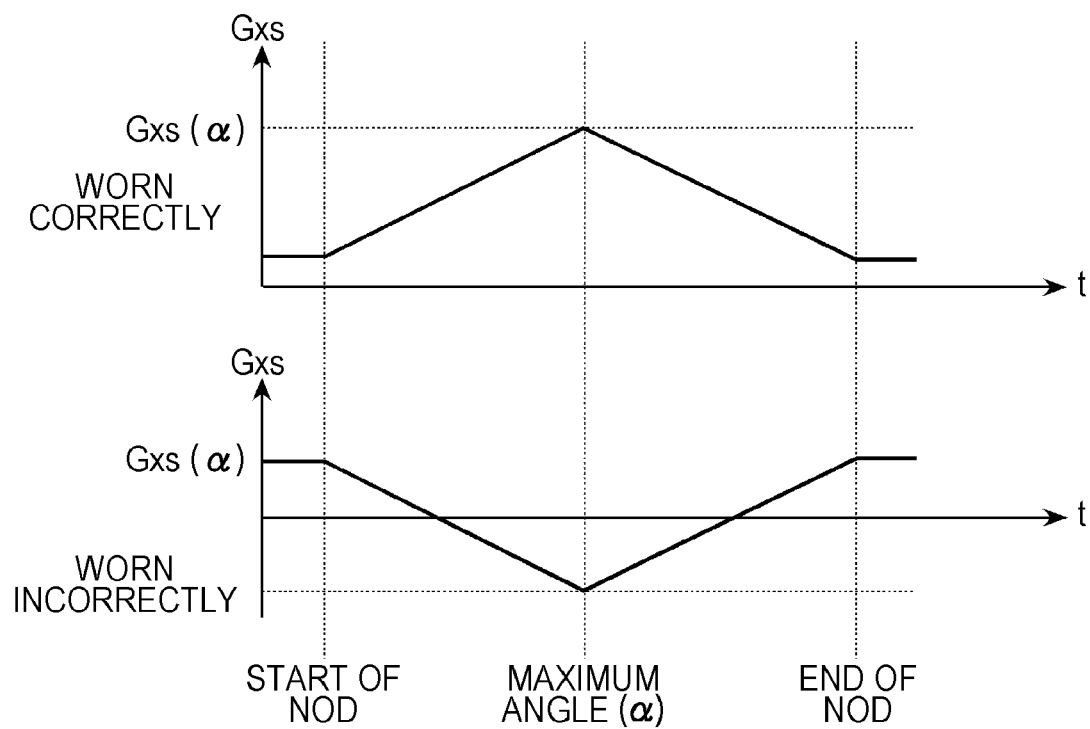
FIG. 13 is a graph illustrating the Xs axis output Gxs (or the Ys axis output Gys) from an acceleration sensor during a nodding gesture in the case where an earphone is being worn on the correct side.

In the exemplary embodiment, the Xs axis output Gxs (or the Ys axis output Gys) from an acceleration sensor during a nodding gesture becomes convex in the case where an earphone is being worn on the correct side, as illustrated in FIG. 13. In contrast, that output becomes concave in the case of being worn on the incorrect side. Consequently, by recognizing the shape from the acceleration sensor, it is possible to determine whether each earphone is being worn on the correct side.

In this way, it is possible to determine whether or not an earphone is being worn on the correct side, according to whether the sensor output for a specific axis (herein, the Xs axis or the Ys axis) of an acceleration sensor exhibits convex variation or concave variation during a nodding gesture.

Figure 14:
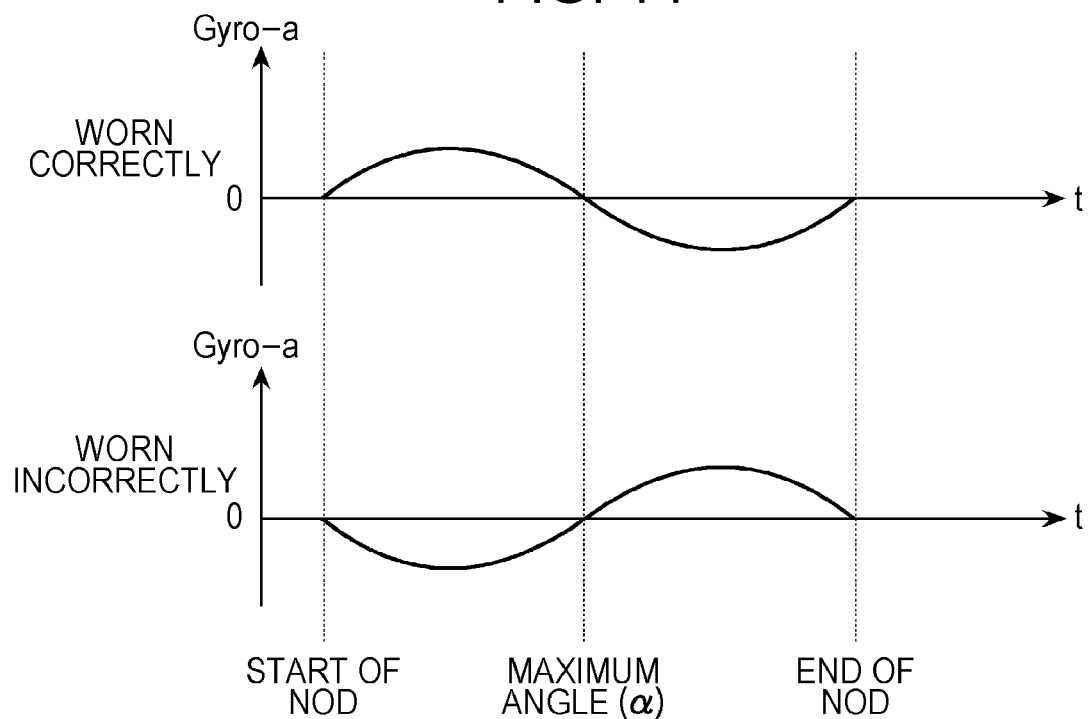
FIG. 14 is a diagram for explaining the case of jointly using a gyroscope with an acceleration sensor.

FIG. 14 is a diagram for explaining the case of jointly using a gyroscope with an acceleration sensor. The motion of a gyroscope about the axis of the nodding rotational direction is reversed when each earphone is worn on the correct side and worn on the incorrect side. In other words, the phase of the waveform in the gyroscope output differs by 180° when an earphone is worn on the left and worn on the right. In the example in the drawing, it is possible to determine whether an earphone is being worn correctly or incorrectly depending on whether the waveform changes from negative to positive or from positive to negative at the zero-crossing.

Figure 15:
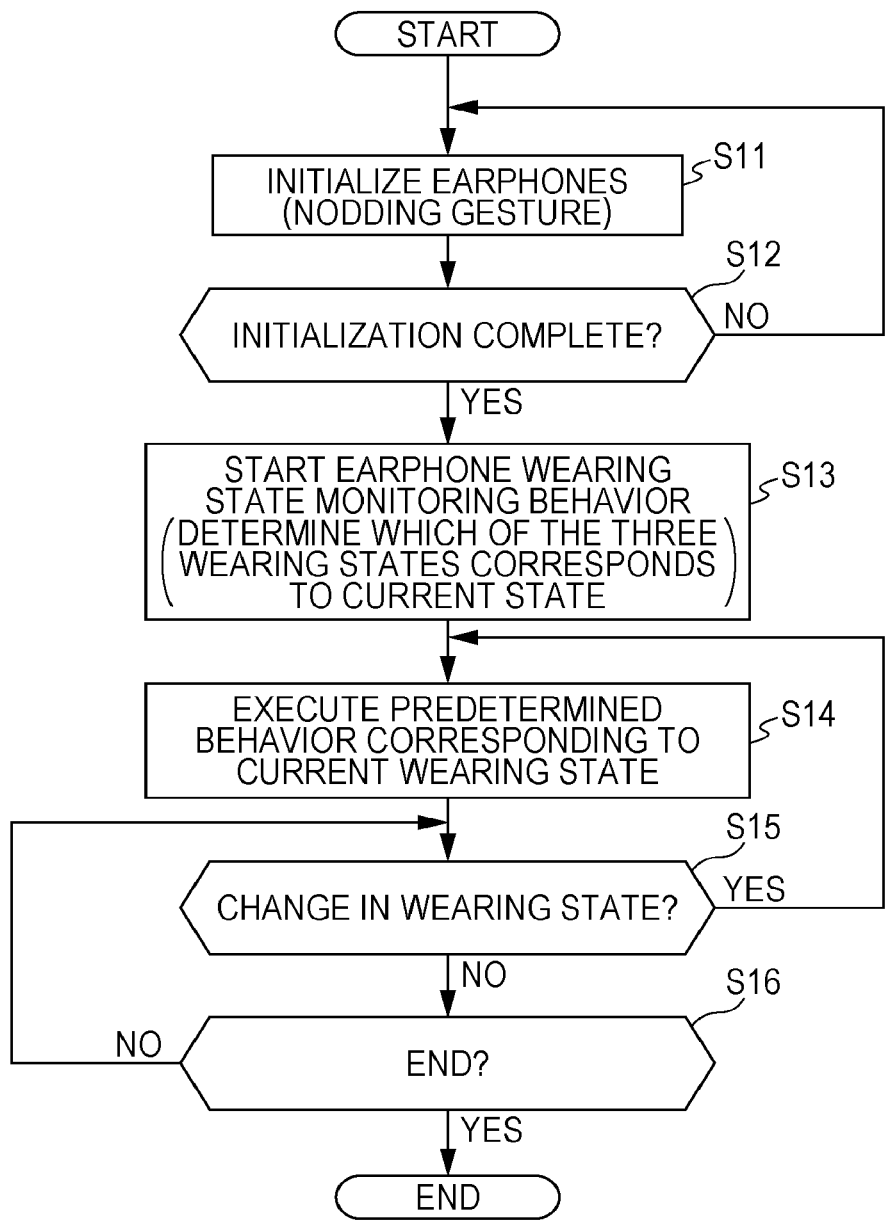
FIG. 15 is a flowchart illustrating exemplary behavior of a mobile device in an exemplary embodiment.

Next, FIG. 15 illustrates exemplary behavior of a mobile device in the exemplary embodiment. This process is executed due to the controller 101 of the mobile device executing a computer program stored in the memory 106 or elsewhere.

First, a given initialization process for the left and right earphones is executed (S11). This initialization process includes the nodding gesture by the user discussed earlier, and at least monitors the output from the acceleration sensors of the left and right earphones during the nodding gesture. By causing the user to perform a nodding gesture while wearing the earphones, it is checked whether each earphone is being worn on the correct side. In the case where an earphone is a predetermined left-ear or right-ear earphone, and that left/right distinction does not match the detected left/right distinction, the user may be warned to that effect by the user interface with a display or sound.

Furthermore, it may also be configured such that when a given nodding gesture is conducted and a given goal is achieved, the user is informed to that effect with a display or sound (or voice).

In addition, it may also be configured such that an incorrect gesture may be determined in the case where a given angle α discussed later is greater than a predetermined angle. It may also be configured such that the user is instructed to retry the nodding gesture with a display or sound (or voice) in the case where the correct wearing of both earphones is not detected after a given amount of time has elapsed since starting execution of the application.

When the initialization process is completed (S12, Yes), the earphone wearing state monitoring behavior is started (S13). This involves monitoring the output from the acceleration sensors and/or geomagnetic sensors, and determining which of the three wearing states discussed earlier corresponds to the current state.

Preset mobile device behavior corresponding to the current wearing state is executed (S14).

Such mobile device behavior includes behavior such as launching or shutting down an application, switching the operational mode in an application, or switching the display in an application, for example.

After that, the wearing state of the left and right earphones is monitored for any change, and in the case of change (S15, Yes), the process returns to step S14 and the mobile device behavior is made to reflect that change.

The process in FIG. 15 ends in response to the shutting down of the application executing the process, or in response to shutdown instructions from the user, for example (S16, Yes).

Figure 16:
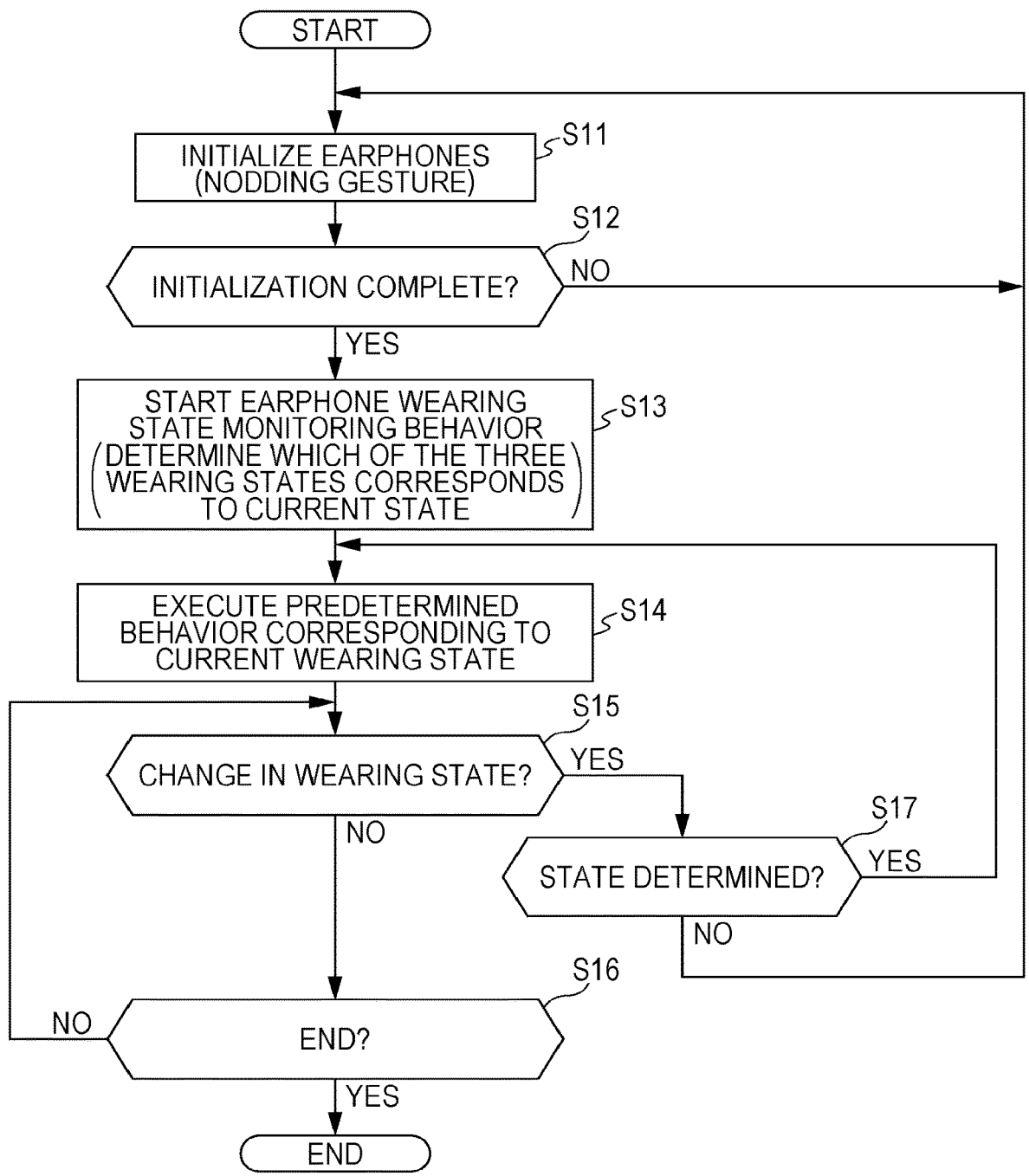
FIG. 16 is a flowchart illustrating an exemplary modification of the process illustrated in FIG. 15.

FIG. 16 is a flowchart illustrating an exemplary modification of the process illustrated in FIG. 15. Like reference signs are given to steps which are similar to those illustrated in FIG. 15, and duplicate description thereof will be reduced or omitted.

The process in FIG. 16 includes an additional new step S17 along the Yes branch of step S15 in FIG. 15. This step S17 is a step of determining whether or not a state has been confirmed when a change in the wearing state has been determined. If a state is confirmed, the process proceeds to step S14. If a state is not confirmed, the process returns to the earphone initialization in the first step S11. In the case of an application that has detected that either the left or right earphone has been removed, but has not specified (or is unable to specify) whether that earphone was the left or right earphone due to asymmetry in the left and right sensor output, returning to the first initialization step S11 makes it possible to re-execute monitoring of the earphone wearing state starting from the initial state. Additionally, even for applications that do specify whether the earphone was the left or right earphone, the process in this exemplary modification still has value in cases where left and right cannot be confirmed for some reason.

FIGS. 17(a) to 17(d) illustrate exemplary control of a mobile device according to the wearing state of left and right earphones. This exemplary control illustrates the control of a display interface and audio output for a mobile device. This represents an example of transitioning to pedestrian audio navigation that gives spoken street directions to a user in an application that displays a map on the display screen of the mobile device.

Figure 17A:
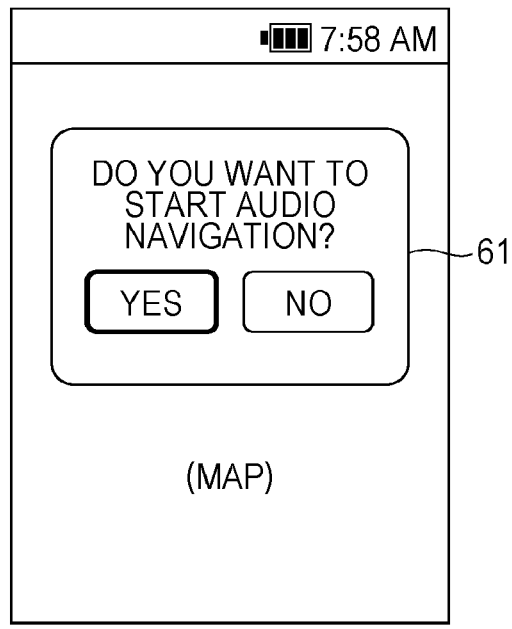
FIGS. 17A, 17B, 17C, and 17D are diagrams for explaining exemplary control of a mobile device according to the wearing state of left and right earphones.

FIG. 17(a) illustrates exemplary control when switching from a state in which neither earphone is worn (the third state) to a state in which both earphones are worn (the first state) while audio navigation is not being executed. In this example, a query message 61 asking "Do you want to start audio navigation?" is displayed to the user, and audio navigation starts in response to the user's explicit instructions (pressing the "Yes" button).

Figure 17B:
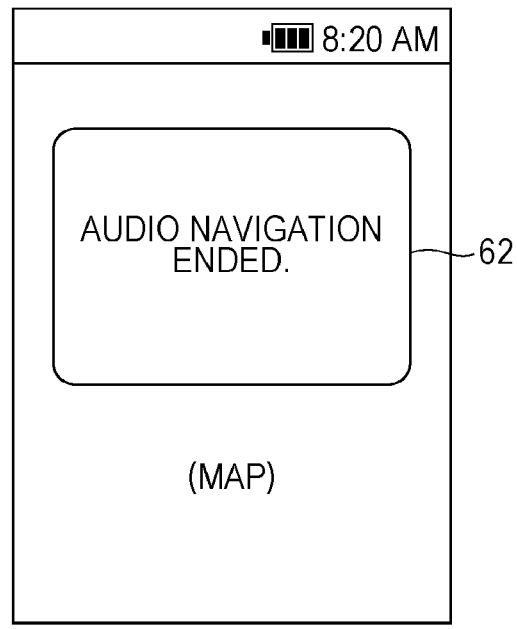

FIG. 17(b) illustrates exemplary control when switching from the first state in which both left and right earphones are worn, or from the second state in which one earphone is worn, to the state in which both earphones are removed (the third state). In this example, a notification message 62 stating "Audio navigation ended." is presented to the user, and audio navigation ends.

Figure 17C:
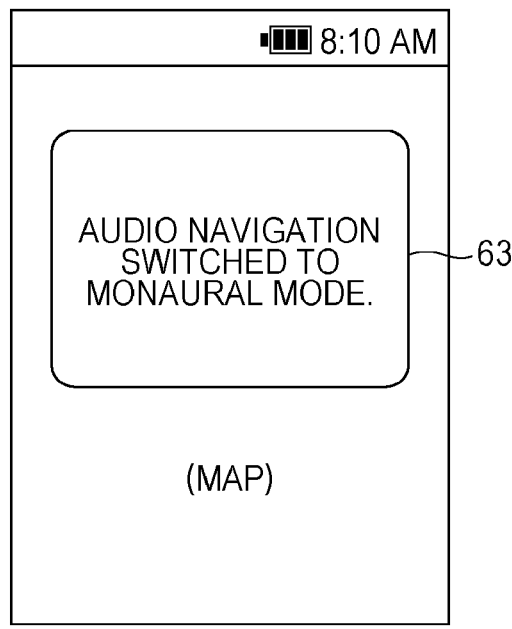

FIG. 17(c) illustrates exemplary control when switching from the first state in which both left and right earphones are worn to the second state in which one earphone is removed. In this example, a notification message 63 stating "Audio navigation switched to monaural mode." is presented, and the audio output operational mode is switched from a stereo mode to a monaural mode. The "monaural mode" referred to herein is envisioned to emit the same audio output to the left and right earphones, but may also emit audio output to only the earphone being worn.

Figure 17D:
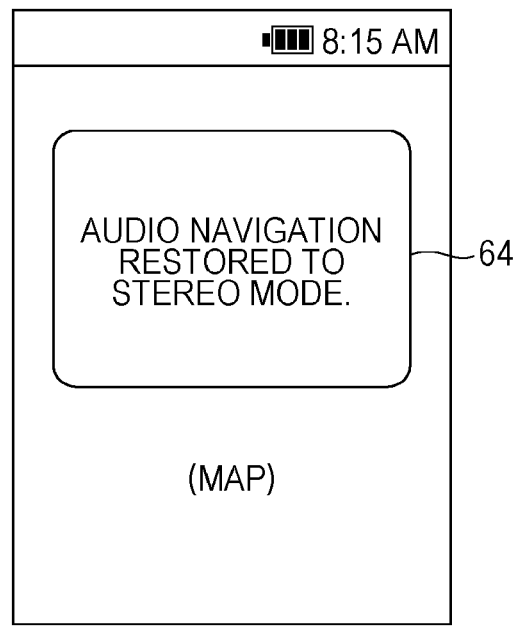

FIG. 17(d) illustrates exemplary control when returning from a state of wearing one earphone (the second state) to the state of wearing both earphones (the first state) while audio navigation is being executed. In this example, a notification message 64 stating "Audio navigation restored to stereo mode." is presented, and the audio output operational mode is switched from monaural mode to stereo mode.

Note that although the example in FIG. 17(a) illustrates the case of confirming the user's intent and then launching an application or changing the operational mode according to the user's explicit instructions, it is not strictly necessary to confirm the user's intent. Conversely, it may also be configured such that a query message is presented instead of a notification message in FIGS. 17(b) to 17(d), and control is switched according to the user's explicit instructions.

Figure 18A:
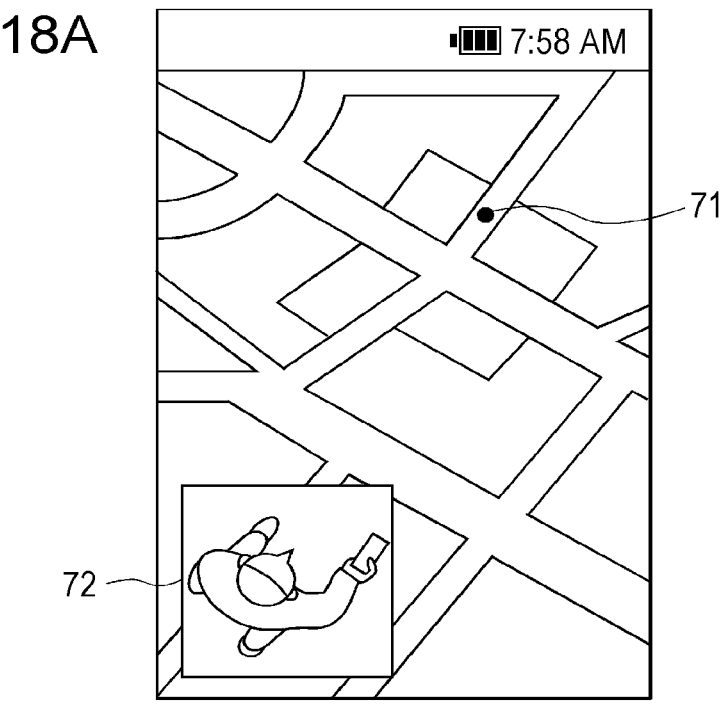
FIGS. 18A and 18B are diagrams illustrating exemplary displays that vary according to the wearing state of left and right earphones, which may be implemented together with, or independently of, the exemplary control for audio navigation illustrated in FIGS. 17A to 17D.
Figure 18B:
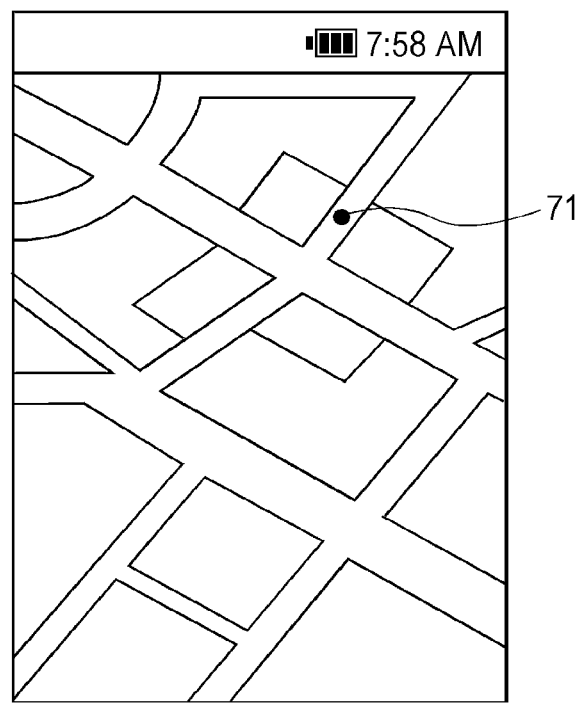

FIGS. 18(a) and 18(b) illustrate exemplary displays that vary according to the wearing state of left and right earphones, which may be implemented together with, or independently of, the exemplary control for audio navigation illustrated in FIGS. 17(a) to 17(d).

FIG. 18(a) is an exemplary display that presents a mark 71 indicating the current position on a map displayed on a display screen, while also presenting a user icon 72 indicating the user's travel direction at that position in a separate area. The user icon 72 is displayed in the case of either the first or second state in which at least one of the left and right earphones is being worn, and indicates that audio navigation is currently activated. In contrast, in the third state in which neither of the left and right earphones are being worn, the user icon 72 is in a hidden display state, as in FIG. 18(b). This display state indicates that audio navigation is not currently activated. In this way, the wearing state of left and right earphones in this example is reflected in whether or not a display element is displayed on a display screen, and also in whether or not a specific application is activated. However, an example of display control is not limited to this example.

Next, a method of using the above nodding gesture to more accurately compute the orientation F of the user's face by an orientation detecting unit of the exemplary embodiment will be described.

Figure 19:
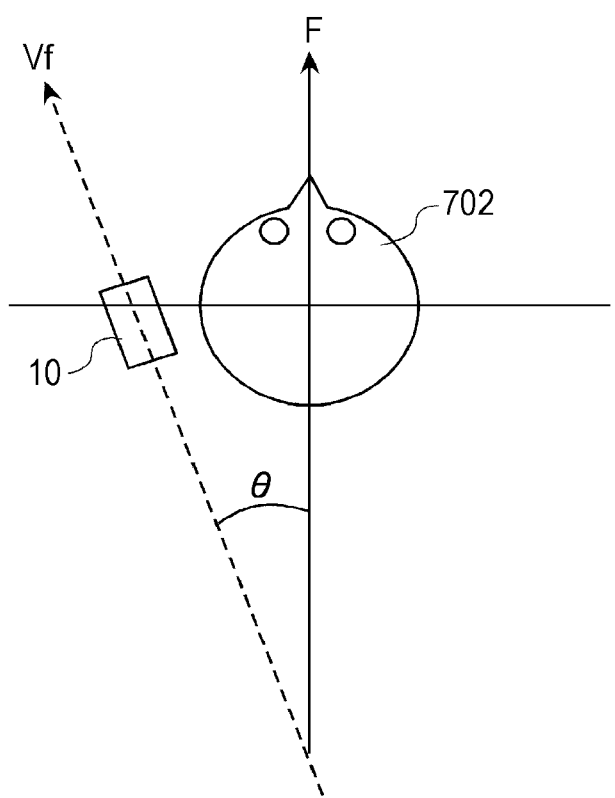
FIG. 19 is a diagram illustrating a state where an earphone is worn on a user's head.

As illustrated in FIG. 19, the forward vector (Vf) of an earphone 10 does not necessarily match the orientation F of the user's face while in a state where the earphone 10 is being worn on the head of the user 702. Thus, when the user wears the earphone 10, the angle differential θ between the forward vector Vf and the orientation F of the face in the horizontal plane is computed and stored on the basis of output from the acceleration sensor 12. Thereafter, while the earphone is being worn, it is possible to compute a correct orientation F of the user's face at that time by correcting the direction of the forward vector Vf by the angle differential θ. Additionally, it is possible to compute the heading (such as north, south, east, or west) in which the user is facing at that time by referring to output from the geomagnetic sensor 11.

Figure 20:
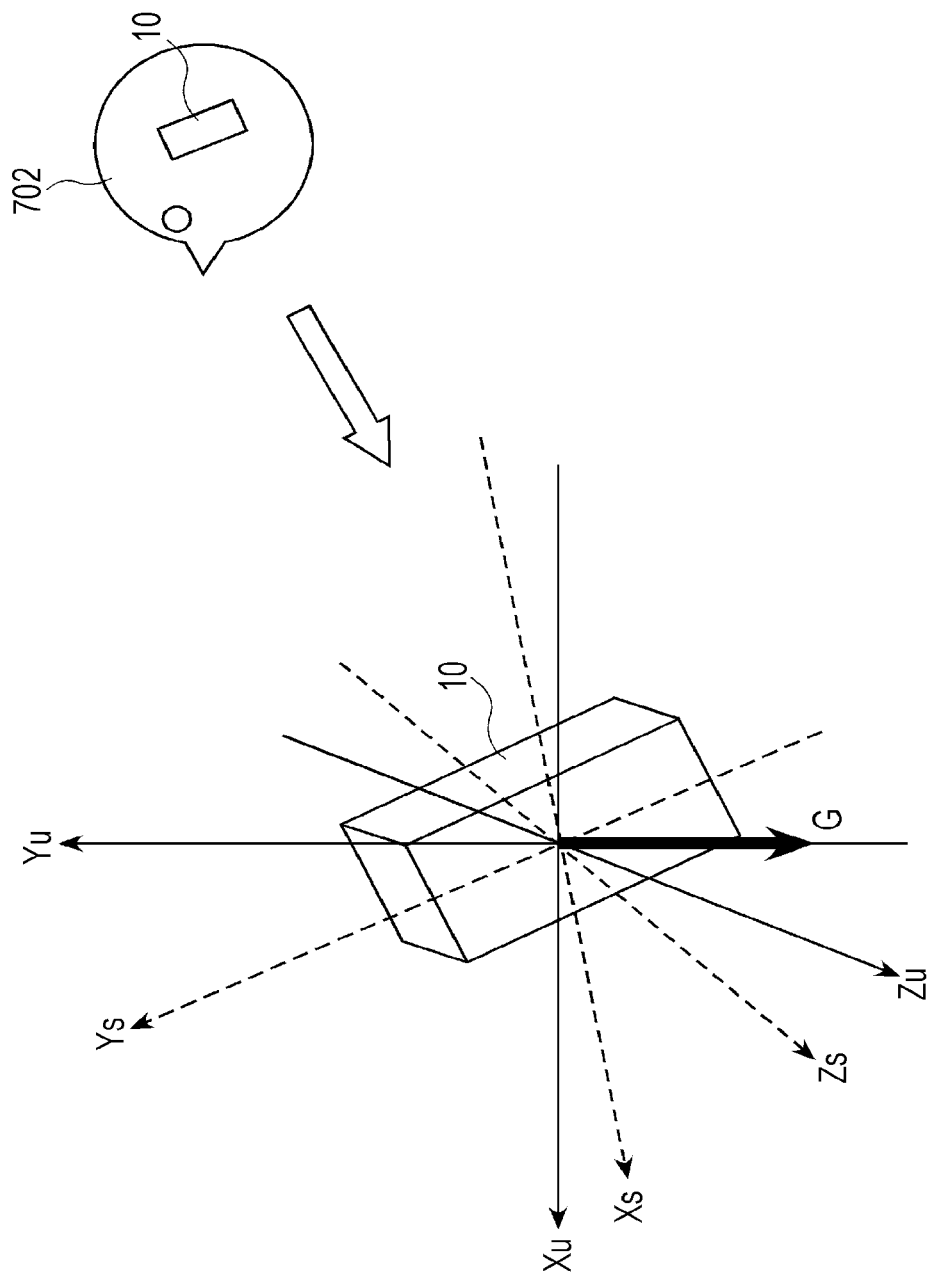
FIG. 20 is a diagram re-illustrating a state in which a user is wearing an earphone, as well as a sensor coordinate system and user coordinate system in such a state.

FIG. 20 once again illustrates a state in which the user 702 is wearing the earphone 10, as well as a sensor coordinate system and user coordinate system in such a state. The gravity vector G observed in the respective coordinate spaces may be expressed according to the following Eqs. 1 and 2.

[Math. 1]
$$Gu = \begin{pmatrix} Gxu \\ Gyu \\ Gzu \end{pmatrix} \quad (1)$$

[Math. 2]
$$Gs = \begin{pmatrix} Gxs \\ Gys \\ Gzs \end{pmatrix} \quad (2)$$

Figure 21:
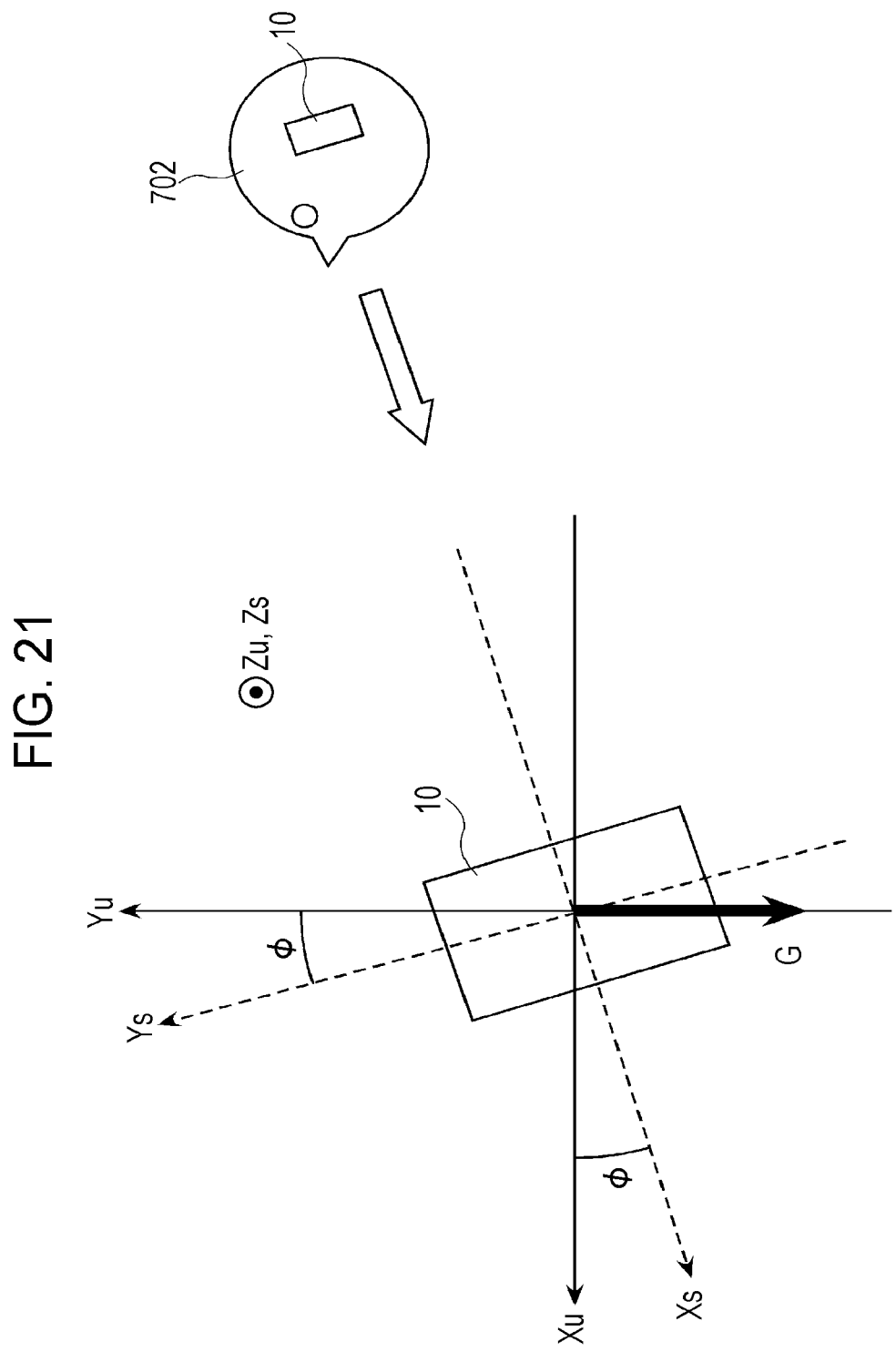
FIG. 21 is a diagram for explaining axis transformation by rotation about the Z axis of an earphone.

As illustrated in FIG. 21, axis transformation by rotation about the Z axis of the earphone 10 is expressed in the following Eq. 3.

[Math. 3]
$$\begin{pmatrix} Gxs \\ Gys \\ Gzs \end{pmatrix} = \begin{pmatrix} Gxu \\ Gyu \\ Gzu \end{pmatrix} \begin{pmatrix} \cos\phi & -\sin\phi & 0 \\ \sin\phi & \cos\phi & 0 \\ 0 & 0 & 1 \end{pmatrix} \quad (3)$$

Herein, the angle φ represents the tilt angle about the Z axis of the Ys axis of the earphone 10 with respect to the Yu axis. In this case, the Zs axis and the Zu axis are taken to approximately match. Gxs, Gys, and Gzs are the axial components of the gravity vector G in the sensor coordinate system, while Gxu, Gyu, and Gzu are the axial components of the gravity vector G in the user coordinate system.

Similarly, as illustrated in FIG. 22, axis transformation by rotation of the earphone 10 about the X axis is expressed in the following Eq. 4.

[Math. 4]
$$\begin{pmatrix} Gxs \\ Gys \\ Gzs \end{pmatrix} = \begin{pmatrix} Gxu \\ Gyu \\ Gzu \end{pmatrix} \begin{pmatrix} 1 & 0 & 0 \\ 0 & \cos\psi & -\sin\psi \\ 0 & \sin\psi & \cos\psi \end{pmatrix} \quad (4)$$

Herein, the angle represents the tilt angle about the X axis of the Ys axis of the earphone 10 with respect to the Yu axis. In this case, the Xs axis and the Xu axis are taken to approximately match.

Figure 23:
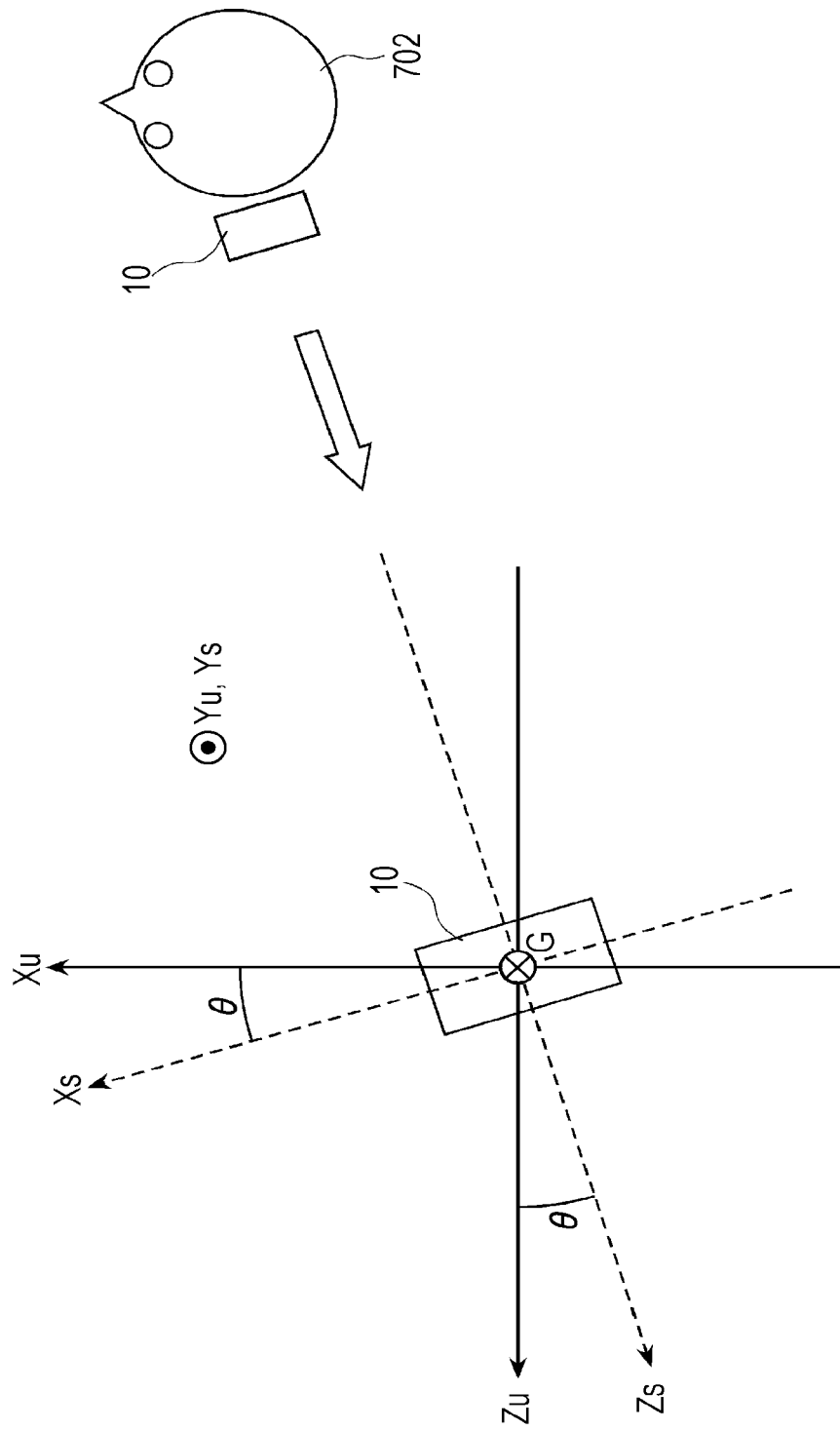
FIG. 23 is a diagram for explaining axis transformation by rotation about the Y axis of an earphone.

Also similarly, as illustrated in FIG. 23, axis transformation by rotation of the earphone 10 about the Y axis is expressed in the following Eq. 5.

[Math. 5]
$$\begin{pmatrix} Gxs \\ Gys \\ Gzs \end{pmatrix} = \begin{pmatrix} Gxu \\ Gyu \\ Gzu \end{pmatrix} \begin{pmatrix} \cos\theta & 0 & \sin\theta \\ 0 & 1 & 0 \\ -\sin\theta & 0 & \cos\theta \end{pmatrix} \quad (5)$$

Herein, the angle θ represents the tilt angle about the Y axis of the Xs axis of the earphone 10 with respect to the Xu axis. In this case, the Ys axis and the Yu axis are taken to approximately match.

An axis transformation that takes into account the three angles φ, ψ, and θ from Eqs. 3, 4, and 5 is expressed in the following Eq. 6.

[Math. 6]

$$\begin{pmatrix} Gxs \\ Gys \\ Gzs \end{pmatrix} = \tag{6}$$

$$\begin{pmatrix} Gxu \\ Gyu \\ Gzu \end{pmatrix} \begin{pmatrix} \cos\phi & -\sin\phi & 0 \\ \sin\phi & \cos\phi & 0 \\ 0 & 0 & 1 \end{pmatrix} \begin{pmatrix} 1 & 0 & 0 \\ 0 & \cos\psi & -\sin\psi \\ 0 & \sin\psi & \cos\psi \end{pmatrix} \begin{pmatrix} \cos\theta & 0 & \sin\theta \\ 0 & 1 & 0 \\ -\sin\theta & 0 & \cos\theta \end{pmatrix} =$$

$$\begin{pmatrix} Gxu(\cos\phi\cos\theta - \sin\phi\cos\psi\sin\theta) - Gyu(\sin\phi\cos\psi) + \\ Gzu(\cos\phi\sin\theta + \sin\phi\sin\psi\cos\theta) \\ Gxu(\sin\phi\cos\theta + \cos\phi\sin\psi\sin\theta) + Gyu(\cos\phi\cos\psi) + \\ Gzu(\cos\phi\sin\theta + \sin\phi\sin\psi\cos\theta) - \\ Gxu(\cos\psi\sin\theta) + Gyu(\sin\psi) + Gzu(\cos\psi\cos\theta) \end{pmatrix}$$

At this point, if g is taken to be a constant expressing the absolute value of the gravitational force, the expression becomes like the following Eq. 7.

[Math. 7]

$$Gu = \begin{pmatrix} Gxu \\ Gyu \\ Gzu \end{pmatrix} = \begin{pmatrix} 0 \\ -g \\ 0 \end{pmatrix} \tag{7}$$

Substituting this Gu into Eq. 6 yields the following Eq. 8.

[Math. 8]

$$\begin{pmatrix} Gxs \\ Gys \\ Gzs \end{pmatrix} = \begin{pmatrix} g\sin\phi\cos\psi \\ -g\cos\phi\cos\psi \\ -g\sin\psi \end{pmatrix} \tag{8}$$

At this point, since g is a constant and the axial values Gxs, Gys, and Gzs of Gs are ascertained from the output of the acceleration sensor, it is possible to compute the angles φ and ψ. However, the angle θ cannot be computed.

Figure 24:
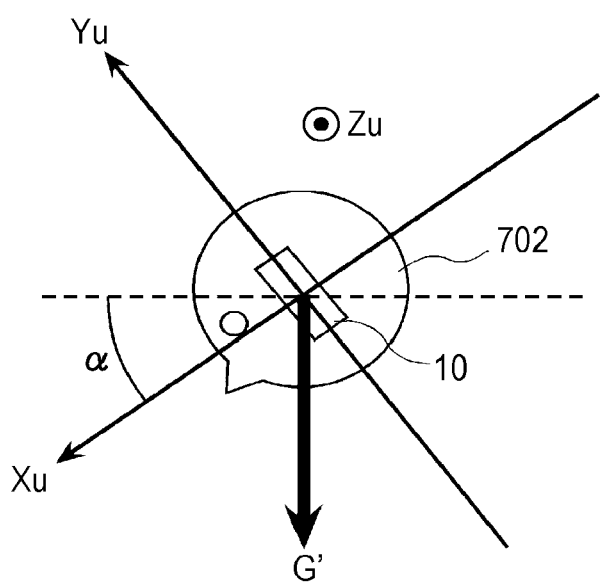
FIG. 24 is a diagram for explaining a nodding gesture that a user is made to execute in a state of wearing an earphone.

Thus, as illustrated in FIG. 24, the user is made to execute a nodding gesture while in a state of wearing the earphone. With this gesture, the vertical plane containing the vector expressing the orientation F of the user's face is determined. More specifically, when the user's head rotates in the vertical plane during the nodding gesture, the maximum rotational angle of the user's head with respect to the horizontal plane (the Xu-Yu plane), or in other words the maximum nodding angle α, is computed. The way to compute this angle α will be discussed later. The gravity vector at the moment of this maximum nodding angle α is taken to be a gravity vector G'. G'u may be expressed like the following Eq. 9.

[Math. 9]

$$G'u = \begin{pmatrix} G'xu \\ G'yu \\ G'zu \end{pmatrix} = \begin{pmatrix} g\sin\alpha \\ -g\cos\alpha \\ 0 \end{pmatrix} \tag{9}$$

Substituting this G'u (in other words, G'xu, G'yu, and G'zu) into the above Eq. 6 yields the following Eq. 10.

[Math. 10]

$$\begin{pmatrix} G'xs \\ G'ys \\ G'zs \end{pmatrix} = \begin{pmatrix} g\sin\alpha(\cos\phi\cos\theta - \sin\phi\cos\psi\sin\theta) + g\cos\alpha(\sin\phi\cos\psi) \\ g\sin\alpha(\sin\phi\cos\theta + \cos\phi\sin\psi\sin\theta) - g\cos\alpha(\cos\phi\cos\psi) \\ -g\sin\alpha(\cos\psi\sin\theta) - g\cos\alpha(\sin\psi) \end{pmatrix} \tag{10}$$

The value of G's (in other words, G'xs, G'ys, and G'zs) is obtained from the output values of the acceleration sensor, and the values of the angles φ and ψ are known in the state before the nod. As a result, the angle θ can be computed. With this angle θ, it is possible to correct error in the orientation of the user's face based on the forward direction of the earphone.

The way of computing the maximum nodding angle α will now be described, with reference to the graphs illustrating change in the gravity-induced acceleration components Gys and Gxs during a nodding gesture illustrated in FIG. 11. As discussed earlier, both graphs are obtained by monitoring the X axis and Y axis sensor output from the acceleration sensors over a given interval at a given sampling period. As the graphs demonstrate, change in the extrema (maximum values) Gys(α) and Gxs(α) appears in the sensor output at the moment of the maximum nodding angle α. Thus, it is possible to compute the angle α by monitoring for such extrema.

The maximum value is used because the precision of the computed angle decreases for non-maximum values due to noise in the acceleration value from the inertial moment while the acceleration sensor is rotating due to the nodding gesture. At the maximum angle, sensor motion momentarily stops, and noise is minimized.

Figure 25:
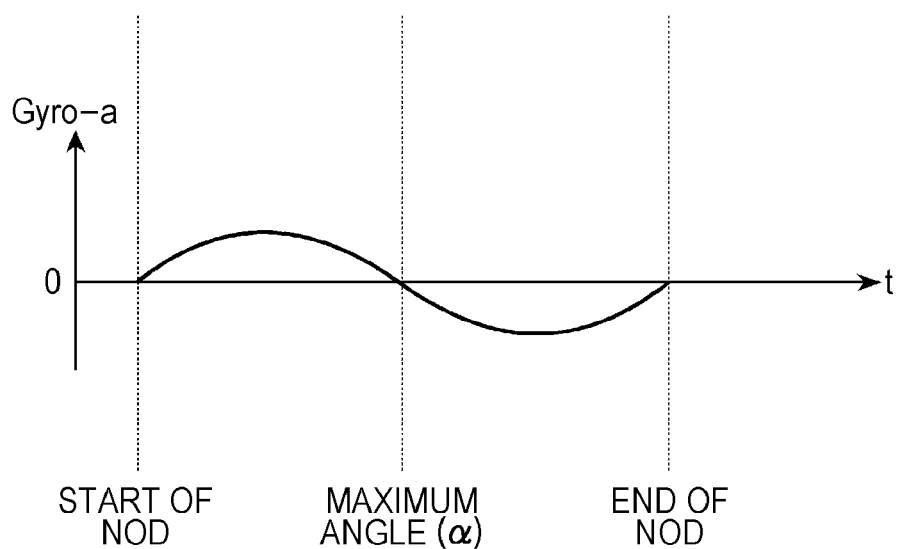
FIG. 25 is a diagram illustrating a waveform of the output from a gyroscope during a nodding gesture.

A gyroscope may be used to further raise the detection precision for the maximum nodding angle α. Taking the rotational direction of the gyroscope during a nodding gesture to be about the a axis, the value of the gyroscope output Gyro-a varies like the sine waveform illustrated in FIG. 25 during the nodding gesture. At the moment when the nodding gesture by the user's head reaches the maximum angle, the gyroscope rotation stops, and its output becomes 0. For this reason, it becomes possible to more precisely compute the angle α by reading the output from the acceleration sensor at the point when the gyroscope output Gyro-a becomes (the zero-crossing point). However, use of a gyroscope is not required.

In this way, even in the case where the earphone wearing angle with respect to the user is offset from the expected wearing position in the XY plane and the YZ plane (the case where φ≠0 and ψ≠0), such tilt can be determined by the output from the acceleration sensor, as discussed above. Consequently, the tilt θ in the XZ plane is similarly and uniquely determined by the nodding gesture, even from such an offset state.

Note that the foregoing description envisions the case where the two earphones in a set of headphones are distinguished as left and right. In this case, the earphones are designed to generate convex sensor output on both left and right while in a correct wearing state during a nodding gesture.

In contrast, in the case where the two earphones in a set of headphones are not distinguished as left and right, both earphones may for example generate convex sensor output when worn on the left and concave sensor output when worn on the right, without distinguishing between the left and right acceleration sensors. Consequently, by checking the shape of the sensor output from the acceleration sensors, it is possible to determine which side each earphone is being worn on.

Note that in this case, one of the waveforms of the left and right sensor output will be convex during the nodding gesture as illustrated in FIG. 11, while the other will be concave. In this case, one of the left and right waveforms may be reversed in sign when comparing the waveforms (or alternatively, the absolute values of the waveforms may be compared).

In the case where the earphones are not distinguished as left and right, it must be confirmed which earphone is being worn on which ear (left or right) while being worn on the user's head, and stereo audio must be correctly transmitted. The above is thus convenient since it is possible to detect, on the basis of sensor output, whether each earphone is being worn on the user's left or right ear. For example, in the case where two earphones are not distinguished as left and right, and may be worn on arbitrary sides, it is determined which earphone is being worn on which side after the earphones are put on. A mobile device may be configured to subsequently conduct a switching control on the basis of the detected results, so as to send left or right audio output to the earphone on the corresponding side.

Figure 26:
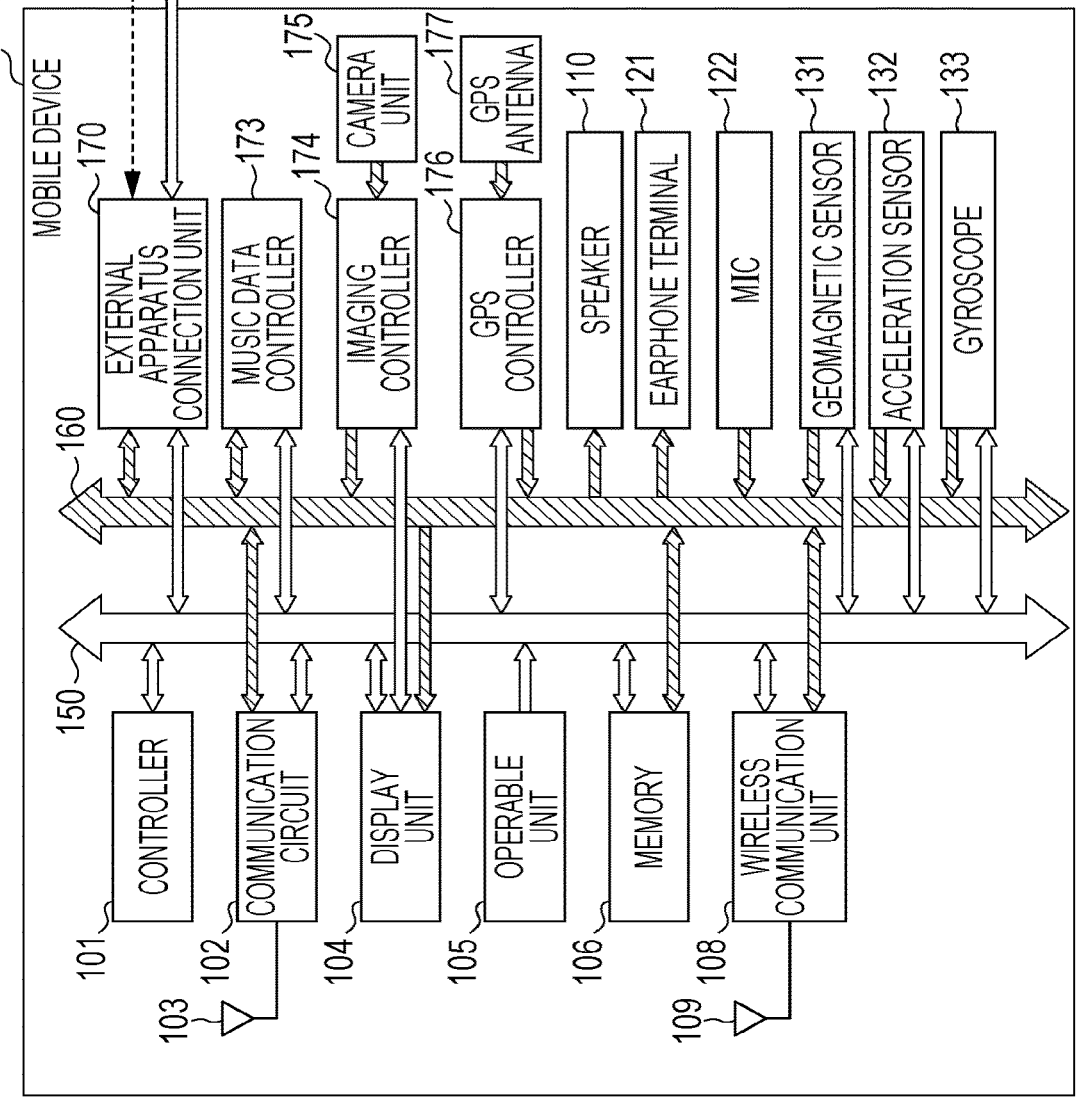
FIG. 26 is a diagram illustrating an exemplary configuration in which the functionality of a mobile device is built into headphones.

The foregoing description envisions the case where the mobile device and the headphones (earphones) are separate. However, a configuration in which the functionality of the mobile device is built into the headphones is also conceivable. FIG. 26 illustrates an exemplary configuration of such a mobile device 100c with integrated headphones. This apparatus may also be interpreted to be headphones with built-in mobile device functionality.

An earphone speaker 421a and mic 422a are attached to the housing of the mobile device 100c.

As illustrated in FIG. 26, in the case of stereo headphones, the configuration in FIG. 10 may be included in only one of the left and right earphones 10bL and 10bR (in this example, 10bL). In this case, the earphone 10bL is equipped with the wireless communication unit 108 instead of the external connection terminal 107, and is wirelessly connected to the other earphone 10bR. Alternatively, although not illustrated, the earphones may be connected to each other in a wired manner via the external connection terminal 107.

Note that not all of the components illustrated are required as the mobile device 100c. Furthermore, other components which are not illustrated, but which are provided in existing mobile devices, may also be included.

As described in the foregoing, an exemplary embodiment includes various aspects like the following.

(1) A method of controlling a mobile device, including
a step of monitoring the wearing state of left and right earphones by a user, and
a step of controlling the behavior of a mobile device connected to the left and right earphones according to the wearing state of the left and right earphones by the user.
(2) The method of controlling a mobile device according to (1), wherein
the wearing states of the left and right earphones include a first state in which both earphones are being worn, a second state in which only the left or right earphone is being worn, and a third state in which both the left and right earphones are removed.
(3) The method of controlling a mobile device according to (2), wherein
in the step of controlling the behavior of the mobile device, at least one of launching or shutting down an application, switching the operational mode in an application, and switching the display in an application is conducted, according to a change in the wearing state of the left and right earphones.
(4) The method of controlling a mobile device according to any of (1) to (3), wherein
in the step of monitoring the wearing state of the left and right earphones, the wearing state of the left and right earphones is detected on the basis of output from left and right acceleration sensors respectively provided in the left and right earphones, and/or output from left and right geomagnetic sensors respectively provided in the left and right earphones.
(5) The method of controlling a mobile device according to any of (1) to (3), further including
a step of causing the user to execute a nodding gesture, in which the user looks directly ahead with respect to his or her body, rotates his or her head forward from an upright state by a given angle or more, and then returns his or her head to its original upright state, and
a step of checking whether each earphone is being worn, on the basis of output during the nodding gesture from left and right acceleration sensors respectively provided in the left and right earphones.
(6) A mobile device, including
left and right earphones, and
a mobile device connectable to the left and right earphones,
wherein each of the left and right earphones includes an acceleration sensor and/or a geomagnetic sensor, and
the mobile device includes a controller that detects the wearing state of the individual left and right earphones by the user on the basis of output from the acceleration sensors and/or the geomagnetic sensors, and controls the behavior of the mobile device connected to the left and right earphones according to the wearing state of the left and right earphones.

Although the foregoing describes a preferred embodiment, it is possible to perform various alterations or modifications other than those mentioned above. In other words, it is to be understood as obvious by persons skilled in the art that various modifications, combinations, and other embodiments may occur depending on design or other factors insofar as they are within the scope of the claims or their equivalents.

For example, although the gyroscope is described as not being required among the multiple sensors on board an earphone, the geomagnetic sensor is also unnecessary if there is no need to compute the heading in which the user's face is facing.

A feature herein is the determining of whether an earphone is being worn on the correct side, depending on whether the output for a specific axis of the 3-axis acceleration sensor that varies during the nodding gesture exhibits convex variation or concave variation. However, this feature does not require actually computing the nodding angle α.

The present specification also encompasses a computer program for realizing the functionality described in the foregoing exemplary embodiments with a computer, as well as a recording medium storing such a program in a computer-readable format. Potential examples of such a recording medium for supplying the program include magnetic storage media (such as a flexible disk, hard disk, or magnetic tape), optical discs (such as an MO, PD, or other magneto-optical disc, a CD, or a DVD), and semiconductor storage, for example.

REFERENCE SIGNS LIST 10, 10L, 10R, 10aL, 10aR, 10bL, 10bR, 10cL, 10cR: earphone

10*a*, 10*b*: earphone (headphone)
11: 3-axis geomagnetic sensor
12: 3-axis acceleration sensor
13: gyroscope
15, 15*a*L, 15*a*R, 15*b*L, 15*b*R: housing
16*a*L, 16*a*R, 16*b*L, 16*b*R: sensor device
17*a*L, 17*a*R, 17*b*L, 17*b*R: ear canal plug
18, 18*i*: cable
19, 19L, 19R: antenna
31: horizontal plane (plane)
33: plane
61: query message
62, 63, 64: notification message
71: mark
72: user icon
100, 100*a*, 100*b*, 100*c*: mobile device
101: controller
102: communication circuit
103: antenna
104: display unit
105: operable unit
106: memory
107: external connection terminal
108: wireless communication unit
109: antenna
110: speaker
121: earphone terminal
122: mic
131: geomagnetic sensor
132: acceleration sensor
133: gyroscope
150: control line
160: data line
170: external apparatus connection unit
171: external storage apparatus
173: music data controller
174: imaging controller
175: camera unit
176: GPS controller
177: GPS antenna
401: external connection controller
411: external geomagnetic sensor
412: external acceleration sensor
413: external gyroscope
421: external speaker
421*a*: speaker
422: external mic
422*a*: mic
430: external wireless communication unit
431: external communication antenna
702: user

What is claimed is:

1. A method implemented by a system comprising a first earphone and a second earphone, wherein each of the first earphone and the second earphone comprise a sensor and a wireless communication circuit, wherein both the first earphone and the second earphone are wireless, the method comprising:
    determining whether the first earphone and second earphone are in a first state in which both earphones are worn by a user, or a second state in which only one of the first earphone and the second earphone is worn by the user, on the basis of an output from at least one of the sensors of the first earphone and the second earphone;
    providing a user interface on a mobile device configured to receive a user input indicating whether or not to change an operational mode of an application running on the mobile device according to the determined state of the first earphone and the second earphone;
    controlling the operational mode of the application running on the mobile device connected to at least one of the first and the second earphones according to the determined state, when the user input indicates to change the operational mode;
    when the determined state is the second state, controlling the first and second earphones to emit audio from the only one of the first and second earphone that is being worn; and
    controlling at least one of launching or shutting down the application, and switching the display in the application, according to a change in the determined state of the first and second earphones.

2. A system comprising:
    a first earphone comprising a first sensor and a first communication circuit;
    a second earphone that comprising a second sensor and a second communication circuit, wherein both the first earphone and the second earphone are wireless; and
    processing circuitry configured to
        determine whether the first earphone and second earphone are in a first state in which both earphones are worn by a user, or a second state in which only one of the first earphone and the second earphone is worn by the user, on the basis of an output from at least one of the sensors of the first earphone and the second earphone;
        provide a user interface on a mobile device configured to receive a user input indicating whether or not to change an operational mode of an application running on the mobile device according to the determined state of the first earphone and the second earphone;
        control the operational mode of the application running on the mobile device connected to at least one of the first and the second earphones according to the determined state, when the user input indicates to change the operational mode;
        when the determined state is the second state, control the first and second earphones to emit audio from the only one of the first and second earphone that is being worn; and
        control at least one of launching or shutting down the application, and switching the display in the application, according to a change in the determined state of the first and second earphones.

3. The system according to claim 1, wherein each sensor comprises at least one of an acceleration sensor and a geomagnetic sensor.

4. The system according to claim 1, wherein the processing circuitry is configured to launch an audio navigation application in which a current position on a map is displayed on a display screen of the mobile device, and when the determined state is the first state or the second state then the audio navigation application is displayed with an indicator of the user's travel direction.

5. The system according to claim 1, wherein when the determined state is the second state, the processing circuitry is further configured to switch from a stereo mode to a monaural mode in both the first and the second earphones.

6. A mobile device comprising:
    a first communication circuit configured to communicate with a first earphone and a second earphone, each of the first earphone and second earphone comprising a sensor, wherein the second earphone comprises a second communication circuit, and both the first earphone and the second earphone are wireless; and processing circuitry configured to determine whether the first earphone and second earphone are in a first state in which both earphones are worn by a user, or a second state in which only one of the first earphone and the second earphone is worn by the user, on the basis of an output from at least one of the sensors of the first earphone and the second earphone;

provide a user interface on the mobile device configured to receive a user input indicating whether or not to change an operational mode of an application running on the mobile device according to the determined state of the first earphone and the second earphone;

control the operational mode of the application running on the mobile device according to the determined state, when the user input indicates to change the operational mode; and when the determined state is the second state, control the first and second earphones to emit audio from the only one of the first and second earphone that is being worn; and control at least one of launching or shutting down the application, and switching the display in the application, according to a change in the determined state of the first and second earphones.

* * * * *